United States Patent
Lee et al.

(10) Patent No.: US 11,775,215 B2
(45) Date of Patent: Oct. 3, 2023

(54) STORAGE DEVICE WITH HOST-CONTROLLED OPERATION MODE, ELECTRONIC SYSTEM INCLUDING THE SAME, AND METHOD OF OPERATING THE SAME

(71) Applicant: Samsung Electronics Co., Ltd., Suwon-si (KR)

(72) Inventors: Byung Ki Lee, Hwaseong-si (KR); Joo Young Hwang, Suwon-si (KR); Jun Hee Kim, Suwon-si (KR); Keun San Park, Hwaseong-si (KR); Je Kyeom Jeon, Siheung-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/395,027

(22) Filed: Aug. 5, 2021

(65) Prior Publication Data
US 2022/0156008 A1    May 19, 2022

(30) Foreign Application Priority Data
Nov. 16, 2020  (KR) ........................ 10-2020-0152806

(51) Int. Cl.
*G06F 3/06*    (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0604; G06F 3/0616; G06F 3/0634; G06F 3/064; G06F 3/0644; G06F 3/0659; G06F 3/0679; G06F 12/0246; G06F 12/0253; G06F 2212/7205; G06F 2212/7211

See application file for complete search history.

(56) References Cited

U.S. PATENT DOCUMENTS

| | | | |
|---|---|---|---|
| 9,196,368 B2 | 11/2015 | Marotta et al. | |
| 9,830,079 B2 | 11/2017 | Kanno | |
| 2008/0172520 A1 | 7/2008 | Lee | |
| 2010/0169543 A1* | 7/2010 | Edgington | G06F 3/064 |
| | | | 711/E12.078 |
| 2010/0332726 A1 | 12/2010 | Wang | |
| 2014/0215129 A1* | 7/2014 | Kuzmin | G06F 12/0246 |
| | | | 711/103 |

(Continued)

FOREIGN PATENT DOCUMENTS

KR    20120110672 A    10/2012

*Primary Examiner* — Larry T MacKall
(74) *Attorney, Agent, or Firm* — Harness, Dickey & Pierce, P.L.C.

(57) ABSTRACT

Provided is a storage device including a non-volatile memory including a first memory block and a second memory block different from the first memory block, and a memory controller configured to receive, from a host, a first write mode command corresponding to the first memory block and a second write mode command corresponding to the second memory block, control the first memory block to perform a first write operation according to the first write mode command, and control the second memory block to perform a second write operation according to the second write mode command, both the first write operation and the second write operation being sequential write operations.

17 Claims, 24 Drawing Sheets

(56) References Cited

U.S. PATENT DOCUMENTS

| | | |
|---|---|---|
| 2019/0095116 A1* | 3/2019 | Igahara ................. G06F 3/0634 |
| 2019/0294499 A1* | 9/2019 | Yang ..................... H03M 13/09 |
| 2020/0142638 A1 | 5/2020 | Byun |
| 2020/0167274 A1 | 5/2020 | Bahirat et al. |

* cited by examiner

FIG. 18

| | Report count | Zone mode Life Time Identifier | Zone Descriptor Header(64B) |
|---|---|---|---|
| 311bh | | | |
| 311b0 | Default Write Mode | Current Write Mode | Zone Descriptor(64B) |
| 311b1 | Default Write Mode | Current Write Mode | Zone Descriptor(64B) |

⋮

| | Default Write Mode | Current Write Mode | Zone Descriptor(64B) |
|---|---|---|---|
| 311b15 | | | |

| Temp (D0) | Write Mode |
|---|---|
| Hot | SLC/MLC |
| Warm | MLC/TLC |
| Cold | TLC/QLC |

STORAGE DEVICE WITH HOST-CONTROLLED OPERATION MODE, ELECTRONIC SYSTEM INCLUDING THE SAME, AND METHOD OF OPERATING THE SAME

This application claims priority from Korean Patent Application No. 10-2020-0152806 filed on Nov. 16, 2020 in the Korean Intellectual Property Office, the disclosure of which is incorporated herein by reference in its entirety.

BACKGROUND

1. Field of the Disclosure

The present disclosure relates to a storage device, an electronic system including the same, and a method of operating the storage device.

2. Description of the Related Art

Memory devices, for example, flash memory devices, are non-volatile memory devices and are widely used in devices such as a universal serial bus (USB) drive, a digital camera, a mobile phone, a smart phone, a tablet personal computer (PC), a memory card, and a solid state drive (SSD).

The flash memory device includes a plurality of blocks, each of the blocks includes a plurality of pages, and each of the plurality of pages includes a plurality of memory cells.

In the flash memory device, a program operation is performed in units of pages, and an erase operation is performed in units of blocks. When data is stored in all or almost all blocks of the flash memory device, a process of moving stale data and properly packing the remaining valid data is performed. Such a process is called garbage collection. The garbage collection is an example of automatic memory management.

Research is being conducted to individually control each block in a memory device from the outside of the memory device in order to improve the write operation efficiency based on type of data of the memory device, or to implement a plurality of virtual operating systems or the like, but the research is difficult to conduct due to the automated nature of the garbage collection.

SUMMARY

Aspects of the present disclosure provide a storage device in which an operation mode is controlled in units of blocks by allowing a host to control the operation mode in units of zones.

Aspects of the present disclosure also provide an electronic system including a storage device in which an operation mode is controlled in units of blocks by allowing a host to control the operation mode in units of zones.

Aspects of the present disclosure also provide a method of operating a storage device in which an operation mode is controlled in units of blocks by allowing a host to control the operation mode in units of zones.

Aspects of the present disclosure also provide a storage device in which memory management is performed in units of zones at a host level.

It should be noted that objects of the present disclosure will be apparent to those skilled in the art from the following descriptions.

According to an aspect of the present disclosure, there is provided a storage device including a non-volatile memory including a first memory block and a second memory block different from the first memory block, and a memory controller configured to receive, from a host, a first write mode command corresponding to the first memory block and a second write mode command corresponding to the second memory block, control the first memory block to perform a first write operation according to the first write mode command, and control the second memory block to perform a second write operation according to the second write mode command, both the first write operation and the second write operation being sequential write operations.

According to an aspect of the present disclosure, there is provided an electronic system including a non-volatile memory including a first memory block and a second memory block, a host including a file system having a first zone and a second zone, the first zone corresponding to the first memory block, and the second zone corresponding to the second memory block, the host configured to provide a first write mode command corresponding to the first memory block to a memory controller, provide a second write mode command corresponding to the second memory block to the memory controller, provide a first write command corresponding to the first zone to the memory controller, and provide a second write command corresponding to the second zone to the memory controller; and the memory controller configured to control the first memory block to performs a first write operation according to the first write command and the first write mode command, and control the second memory block to perform a second write operation according to the second write command and the second write mode command.

According to an aspect of the present disclosure, there is provided a method of operating a storage device, the method including receiving a first write mode command corresponding to a first memory block, the first memory block corresponding to a first zone in a file system, receiving a second write mode command corresponding to a second memory block, the second memory block corresponding to a second zone in the file system, and the second zone being different from the first zone, receiving a first write command corresponding to the first zone, performing a first write operation on the first memory block according to the first write command and the first write mode command, receiving a second write command corresponding to the second zone, and performing a second write operation on the second memory block according to the second write command and the second write mode command, both the first write operation and the second write operation being sequential write operation.

BRIEF DESCRIPTION OF THE DRAWINGS

The above and other aspects and features of the present disclosure will become more apparent by describing some example embodiments thereof in detail with reference to the attached drawings, in which:

FIGS. 17 and 18 are diagrams for describing a method of determining an operation mode in the electronic system according to some example embodiments of the present disclosure;

FIG. 19 is a diagram for describing an operation of the electronic system according to some example embodiments of the present disclosure;

DETAILED DESCRIPTION

Figure 1:
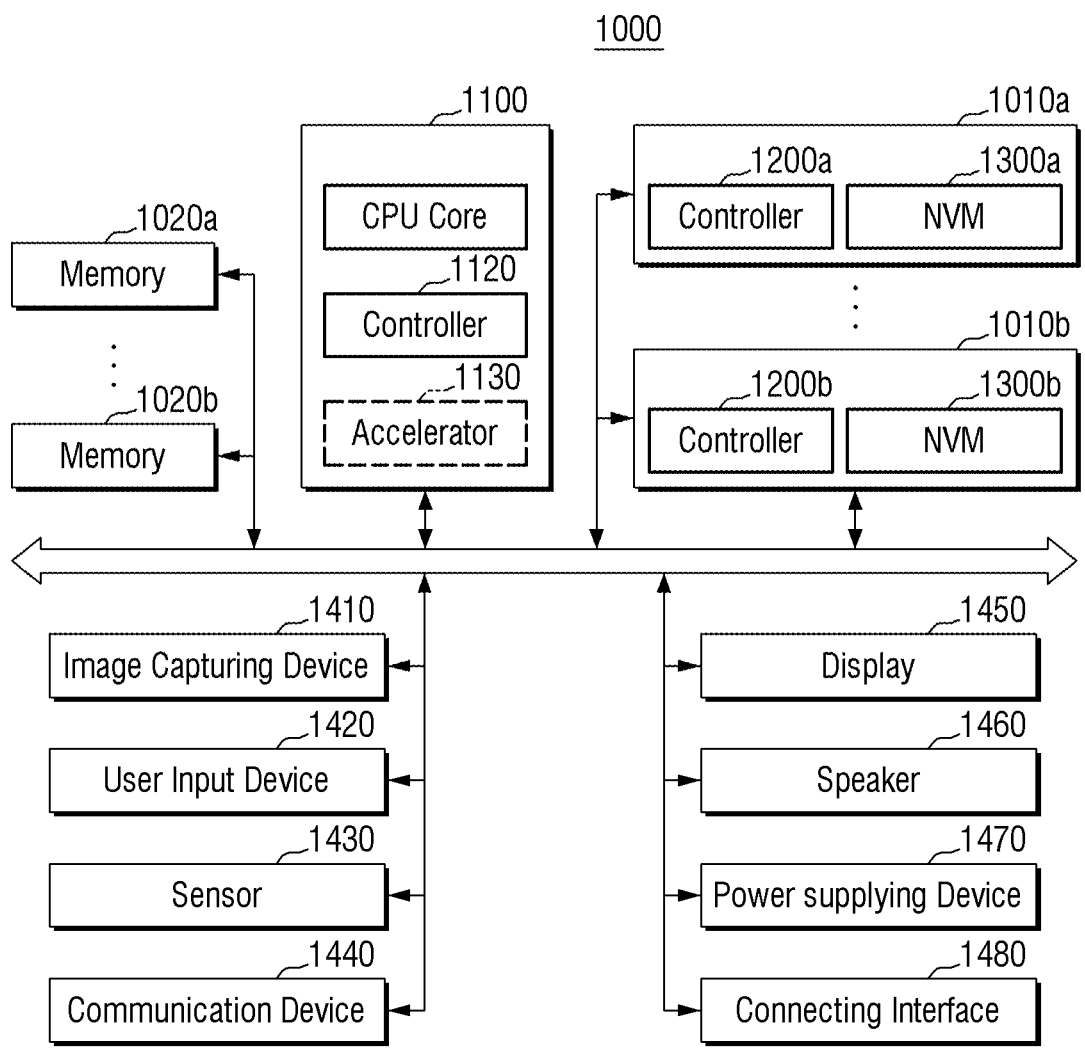
FIG. 1 is a block diagram illustrating an electronic system according to some example embodiments of the present disclosure.

Hereinafter, some example embodiments of the present disclosure will be described with reference to the accompanying drawings. In the description of FIGS. 1 to 24, substantially the same components will be denoted by the same reference numerals, and an overlapping description for the corresponding components will be omitted. In addition, like reference numerals are used for like components throughout the various drawings of the present disclosure.

FIG. 1 is a block diagram illustrating an electronic system according to some example embodiments of the present disclosure.

A system 1000 of FIG. 1 may basically be a mobile system such as a mobile phone, a smart phone, a tablet personal computer (PC), a wearable device, a healthcare device, and/or an Internet of Things (JOT) device. However, the system 1000 of FIG. 1 is not limited to the mobile system, but may be a personal computer, a laptop computer, a server, a media player, and/or an automotive device such as a navigation device.

Referring to FIG. 1, the system 1000 may include a main processor 1100, memories 1020a and 1020b, and/or storage devices 1010a and 1010b, and may additionally include at least one of an image capturing device 1410, a user input device 1420, a sensor 1430, a communication device 1440, a display 1450, a speaker 1460, a power supplying device 1470, and/or a connecting interface 1480.

The main processor 1100 may control overall operations of the system 1000, and more particularly, operations of other components forming the system 1000. The main processor 1100 may be implemented as a general-purpose processor, a dedicated processor, an application processor, or the like.

The main processor 1100 may include one or more central processing unit (CPU) cores 1110 and may further include a controller 1120 for controlling the memories 1020a and 1200b and/or the storage devices 1010a and 1010b. Depending on some example embodiments, the main processor 1100 may further include an accelerator block 1130, which is a dedicated circuit for high-speed data operation such as artificial intelligence (AI) data operations. The accelerator block 1130 may include a graphics processing unit (GPU), a neural processing unit (NPU), and/or a data processing unit (DPU) and may be implemented as a separate chip physically independent from other components of the main processor 1100.

The memories 1020a and 1020b may be used as main memory devices of the system 1000, and may include volatile memories such as a static random access memory (SRAM) and/or a dynamic RAM (DRAM), but may include a non-volatile memory (NVM) such as a flash memory, a phase-change RAM (PRAM), a magneto-resistive RAM (MRAM), and/or a resistive RAM (RRAM). The memories 1020a and 1020b may be implemented in the same package as, or a similar package to, the main processor 1100.

The storage devices 1010a and 1010b may function as non-volatile storage devices that store data regardless of whether power is supplied or not and may have a relatively large storage capacity as compared to the memories 1020a and 1020b. The storage devices 1010a and 1010b may include storage controllers 1200a and 1200b and NVMs 1300a and 1300b, respectively, that store data under the control of the storage controllers 1200a and 1200b. The NVMs 1300a and 1300b may include V-NAND flash memories of a two-dimensional (2D) or three-dimensional (3D) structure but may include other types of non-volatile memory, such as PRAMs, MRAMs, and/or RRAMs.

The storage devices 1010a and 1010b may be included in the system 1000 in a physically separated state from the main processor 1100 or may be implemented in the same package as, or a similar package to, the main processor 1100. In addition, the storage devices 1010a and 1010b may have the same shape as, or a similar shape to, a memory card and may be detachably coupled to other components of the system 1000 through an interface such as the connecting interface 1480 to be described later. The storage devices 1010a and 1010b may be devices to which standard protocol such as universal flash storage (UFS) or NVM express (NVMe) is applied, but the present disclosure is not limited thereto.

The image capturing device 1410 may capture a still image or a video, and may be a camera, a camcorder, a webcam, and/or the like.

The user input device 1420 may receive various types of data input from a user of the system 1000, and may be a touch pad, a keypad, a keyboard, a mouse, a microphone, and/or the like.

The sensor 1430 may sense various types of physical quantities that may be obtained from the outside of the system 1000 and convert the sensed physical quantities into electrical signals. The sensor 1430 may be a temperature sensor, a pressure sensor, an illuminance sensor, a position sensor, an acceleration sensor, a biosensor, a gyroscope, and/or the like.

The communication device 1440 may perform transmission and/or reception of signals between the system 1000 and other devices outside the system 1000 according to various communication protocols. The communication device 1440 may be implemented by including an antenna, a transceiver, a modem, and/or the like.

The display 1450 and the speaker 1460 may function as output devices that respectively output visual information and audio information to the user of the system 1000.

The power supplying device 1470 may appropriately convert power supplied from a battery (not shown) embedded in the system 1000 and/or an external power supply and supply the converted power to each of the components of the system 1000.

The connecting interface 1480 may provide a connection between the system 1000 and an external device that is connected to the system 1000 and capable of exchanging data with the system 1000. The connecting interface 1480 may be implemented in various interface methods such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, universal serial bus (USB), a secure digital (SD) card, multi-media card (MMC), embedded MMC (eMMC), UFS, embedded UFS (eUFS), and/or a compact flash (CF) card interface.

Figure 2:
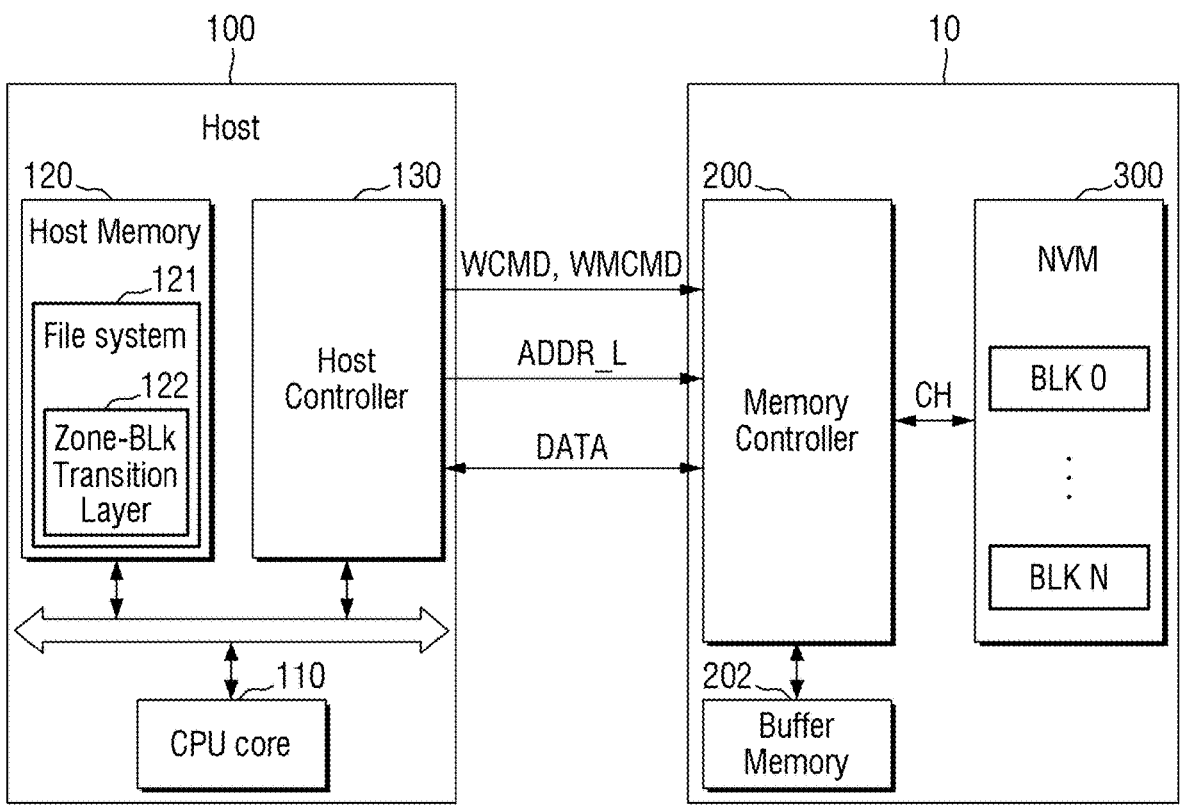
FIG. 2 is a block diagram for describing an electronic system including a storage device according to some example embodiments of the present disclosure.

FIG. 2 is a block diagram for describing an electronic system including a storage device according to some example embodiments of the present disclosure.

Referring to FIG. 2, an electronic system 1*a* may include a storage device 10 and/or a host device 100. The host device 100 may control operations of the storage device 10. The storage device 10 may correspond to the storage device 1010*a* and/or 1010*b* of FIG. 1.

In some example embodiments, the storage device 10 may correspond to a flash memory device that includes one or more flash memory chips. In some example embodiments, the storage device 10 may be an embedded memory embedded in the electronic system 1*a*. For example, the storage device 10 may be an eMMC, eUFS, or an NVMe memory device.

Depending on some example embodiments, the storage device 10 may be an external memory that is attachable to or detachable from the electronic system 1*a*. For example, the storage device 10 may be a UFS memory card, a CF card, an SD card, a micro-SD card, a mini-SD card, an extreme digital (xD) card, and/or a memory stick.

The host device 100 may include a processor 110, a host memory 120, and/or a host controller 130. The processor 110, the host memory 120, and the host controller 130 may transmit and/or receive signals to and from each other through an internal bus.

The processor (CPU core) 110 may execute various software loaded in the host memory 120. For example, the processor 110 may execute an operating system (OS) and application programs. The processor 110 may be provided as a homogeneous multi-core processor or a heterogeneous multi-core processor. The processor 110 may correspond to the main processor 1100 of FIG. 1.

The host memory 120 may be used as a main memory and/or a cache memory. In addition, the host memory 120 may be used as a driving memory for driving software, firmware, or the like. Application programs or data to be processed by the processor 110 may be loaded in the host memory 120. For example, a file system 121, an application program, a device driver, and the like may be loaded in the host memory 120. The host memory 120 may correspond to the memory 1020*a* and/or 1020*b* of FIG. 1.

The file system 121 may store files or data in the storage device 10, and organize the files or data in units of zones.

The file system 121 may include a zone-memory block transition layer 122. The file system 121 may provide a logical address ADDR_L to the storage device 10 through the zone-memory block transition layer 122 according to a command (e.g., a write command WCMD or a read command). The file system 121 may be used in accordance (e.g., compatible) with a specific operating system being executed in the host device 100, and the operating system may support the execution of the files or data in units of zones. According to some example embodiments, a plurality of different file systems 121 may be used, each corresponding to (used in accordance with, compatible with, etc.) a different specific operating system executed in the host device 100.

The host device 100 may manage a storage space of the storage device 10 using the zone-memory block transition layer 122, write user data to the storage device 10, and read the user data from the storage device 10. The file system 121 and the zone-memory block transition layer 122 may be implemented through software, firmware, or the like.

The host controller 130 may convert a data format of commands (e.g., the write command WCMD and/or a write mode command WMCMD) corresponding to various access requests issued by the host device 100, the logical address ADDR_L, data DATA, and the like, or convert a format of the commands exchanged, and send the converted commands, address, and data to the storage device 10. The host controller 130 may have a protocol corresponding to that of the connecting interface 1480 of FIG. 1.

In some example embodiments, the host device 100 may provide a physical mapping command PMCMD, which is distinct from the write command WCMD, to the storage device 10 separately from the write command WCMD. In some example embodiments, the physical mapping command PMCMD may be included in a portion of the write command WCMD.

The storage device 10 may include a memory controller 200, a buffer memory 202, and/or an NVM 300. The storage device 10 may access the NVM 300, or perform requested operations, in response to commands provided from the host device 100.

The memory controller 200 may control the operations of the NVM 300 through a channel CH. The memory controller 200 may receive the write command WCMD and the logical address ADDR_L from the host device 100, and write the data DATA to the NVM 300. A detailed description of the logical address ADDR_L according to some example embodiments of the present disclosure will be given below in the description of FIG. 10. According to some example embodiments, the memory controller 200 may correspond to the storage controller 1200*a* and/or 1200*b*, and the NVM 300 may correspond to the NVM 1300*a* and/or 1300*b*, as discussed in association with FIG. 1.

The memory controller 200 may determine an operation mode, e.g. a write mode, for the logical address ADDR_L transmitted from the host in response to the write mode command WMCMD.

A detailed description of the configuration and operation of the memory controller 200 will be given below with reference to FIG. 3.

The buffer memory 202 may temporarily store write data or read data. The write data temporarily stored in the buffer memory 202 may be written to the NVM 300, and the read data temporarily stored in the buffer memory 202 may be transmitted to the host device 100 through the memory controller 200.

The NVM 300 may perform a read/write operation under the control of the memory controller 200. The NVM 300 may include a plurality of memory blocks BLK 0 to BLK N, and each of the memory blocks may include a plurality of pages. Each of the pages may include a plurality of memory cells. In some example embodiments, the NVM 300 may perform an erase operation in units of memory blocks and may perform a write or read operation in units of pages.

A physical address may correspond to a specific area of the NVM 300. For example, a physical address for selecting a page may be a physical page number (PPN), and a physical address for selecting a memory block may be a physical block number (PBN).

In some example embodiments, the NVM 300 may include a plurality of flash memory cells. For example, the plurality of memory cells may be NAND flash memory cells. However, the present disclosure is not limited thereto, and the memory cells may be resistive memory cells such as resistive RAM (ReRAM), PRAM, and/or MRAM.

Figure 3:
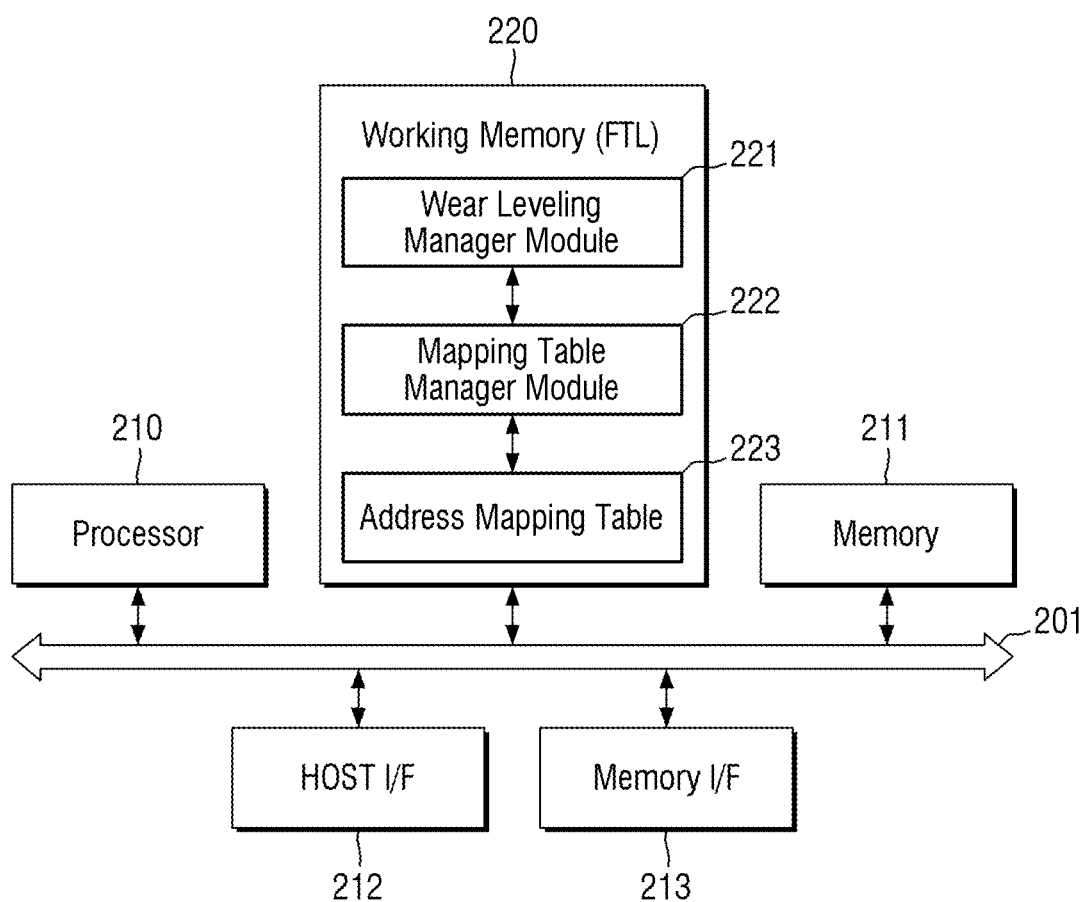
FIG. 3 is a block diagram for describing a memory controller of FIG. 2.
Figure 4:
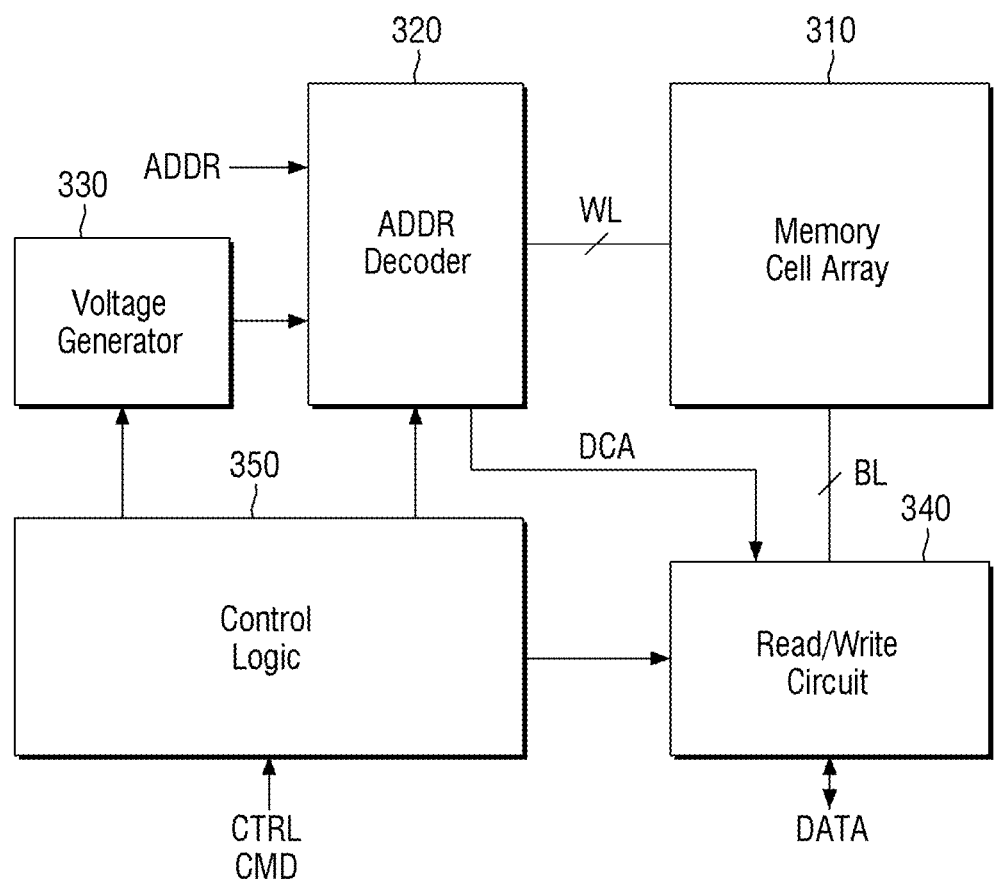
FIG. 4 is a block diagram for describing a non-volatile memory of FIG. 2.

FIG. 3 is a block diagram for describing the memory controller of FIG. 2. FIG. 4 is a block diagram for describing the NVM of FIG. 2.

Referring to FIGS. 3 and 4, the memory controller 200 may include a processor 210, a memory 211, a host interface 212, a memory interface 213, and/or a working memory 220. According to some example embodiments, the components of the memory controller 200 (e.g., the processor 210, the memory 211, the host interface 212, the memory interface 213, and/or the working memory 220) may be coupled together and able to communicate (e.g., via a bus 201).

The processor 210 may include a CPU, a controller, an application-specific integrated circuit (ASIC), and/or the like. The processor 210 may control overall operations of the memory controller 200. The processor 210 may drive firmware loaded in the working memory 220 to control the memory controller 200.

The memory 211 may store code data used for initial booting of the storage device 10 (see FIG. 2).

The memory controller 200 may be connected to the host device 100 through the host interface 212. That is, the data DATA may be transmitted and received through the host interface 212. The host interface 212 may include ATA, SATA, e-SATA, USB, NVMe, and/or the like.

The memory controller 200 may be connected to the NVM 300 through the memory interface 213. That is, the data DATA, control signals CTRL, addresses ADDR, commands CMD, and/or the like may be transmitted and received through the memory interface 213. The working memory 220 may be implemented as a cache memory, a DRAM, an SRAM, a flash memory, and/or the like.

The working memory 220 may include a flash transition layer (FTL). The FTL may include system software for managing write, read, and erase operations of the NVM 300. For example, the FTL may include firmware. The FTL may be loaded in the working memory 220. The firmware of the FTL may be executed by the processor 210.

The working memory 220 may include a wear-leveling manager module 221, a mapping table manager module 222, and/or an address mapping table 223.

The working memory 220 may convert the logical address ADDR_L into a physical address using the address mapping table 223 and provide the physical address to the NVM 300.

The working memory 220 according to some example embodiments of the present disclosure may perform management of the memory cells of the NVM 300. For example, the working memory 220 may perform a wear-leveling management operation on the blocks BLK 0 to BLK N (see FIG. 2) of a memory cell array 310 of the NVM 300.

The wear-leveling manager module 221 may manage a wear level of the NVM 300 by adjusting a program/erase (P/E) cycle, and the wear-leveling manager module 221 according to some example embodiments of the present disclosure performs a wear leveling operation in the same units (unit of erase operation) as, or similar units to, the memory blocks BLK 0 to BLK N (see FIG. 2) of the memory cell array 310 so that the mapping table manager module 222 may be controlled at the host device 100 level.

The memory controller 200 according to some example embodiments of the present disclosure does not perform a garbage collection operation so that the host device 100 directly controls the mapping table manager module 222 of the storage device 10 through the logical address ADDR_L.

The mapping table manager module 222 may update the address mapping table 223 by reflecting results of a wear leveling operation, a control by a command of the host device 100, creation/deletion of a namespace, and/or the like.

Although not shown in the drawings, when the host device 100 and the storage device 10 support multiple namespaces, the storage device 10 may include a namespace manager module, and the namespace manager module may dynamically create namespaces in response to commands from the host device 100 and request the mapping table manager module 222 to update the address mapping table 223 according to the commands, which are related to the namespaces, of the host device 100.

Referring to FIG. 4, the NVM 300 may include the memory cell array 310, an address decoder 320, a voltage generator 330, a read/write circuit 340, a control logic 350, and/or the like.

The memory cell array 310 may be connected to the address decoder 320 through word lines WL. The memory cell array 310 may be connected to the read/write circuit 340 through bit lines BL. The memory cell array 310 may include a plurality of memory cells. For example, the memory cells arranged in a row direction may be connected to the word lines WL. For example, the memory cells arranged in a column direction may be connected to the bit lines BL.

The address decoder 320 may be connected to the memory cell array 310 through the word lines WL. The address decoder 320 may operate in response to a control of the control logic 350. The address decoder 320 may receive the addresses ADDR from the memory controller 200. The address decoder 320 may receive voltages used for operations, such as programming, reading, and the like, from the voltage generator 330.

The address decoder 320 may decode a row address of the received addresses ADDR. The address decoder 320 may select the word line WL using the decoded row address. A decoded column address DCA may be provided to the read/write circuit 340. For example, the address decoder 320 may include a row decoder, a column decoder, an address buffer, and/or the like.

The voltage generator 330 may generate voltages used for access operations under the control of the control logic 350. For example, the voltage generator 330 may generate a program voltage and a program verification voltage used to perform a program operation. For example, the voltage generator 330 may generate read voltages used to perform a read operation, and generate an erase voltage, an erase verification voltage, and the like used to perform an erase operation. In addition, the voltage generator 330 may provide voltages, which are used for the address decoder 320 to perform all operations, to the address decoder 320.

The read/write circuit 340 may be connected to the memory cell array 310 through the bit lines BL. The read/write circuit 340 may transmit and receive data DATA to and from the memory controller 200. The read/write circuit 340 may operate in response to a control of the control logic 350. The read/write circuit 340 may receive the decoded column address DCA from the address decoder 320. The read/write circuit 340 may select the bit line BL using the decoded column address DCA.

For example, the read/write circuit 340 may program the received data DATA into the memory cell array 310. The read/write circuit 340 may read data from the memory cell array 310 and provide the read data to the external device (e.g., the memory controller 200). For example, the read/write circuit 340 may include components such as a sense amplifier, a write driver, a column selection circuit, a page buffer, and/or the like.

The control logic 350 may be connected to the address decoder 320, the voltage generator 330, and the read/write circuit 340. The control logic 350 may control the operations of the NVM 300. The control logic 350 may operate in response to the control signals CTRL and the commands CMD (e.g., a write command, a read command, and the like) provided from the memory controller 200.

Figure 5:
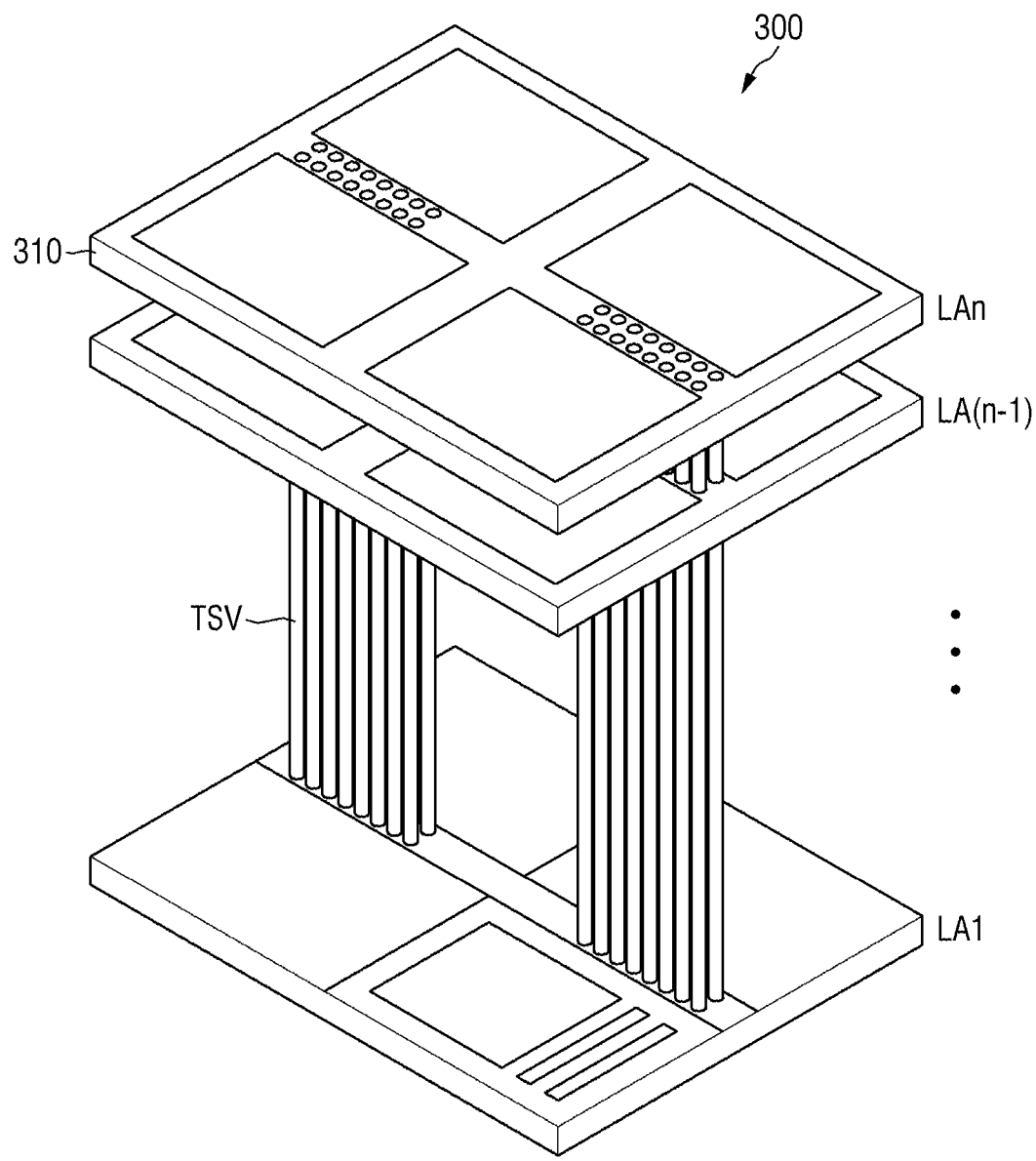
FIG. 5 is a perspective view illustrating the non-volatile memory according to some example embodiments of the present disclosure.

FIG. 5 is a perspective view illustrating the NVM according to some example embodiments.

Referring to FIGS. 4 and 5, the NVM 300 according to some example embodiments may include a plurality of semiconductor layers LA1 to LAn. Each of the plurality of semiconductor layers LA1 to LAn may be a memory chip (e.g., a DRAM chip), or some of the plurality of semiconductor layers LA1 to LAn may be master chips that perform interfacing with the external device (e.g., the host device 100 of FIG. 1) and the others thereof may be slave chips that store data.

For example, an nth layer LAn and a first layer of the NVM 300 may be semiconductor chips including the memory cell array 310. The plurality of semiconductor layers LA1 to LAn may transmit and receive signals to and from each other through the through silicon vias TSV. The configuration and arrangement of the NVM 300 according to some example embodiments are not limited thereto.

Figure 6:
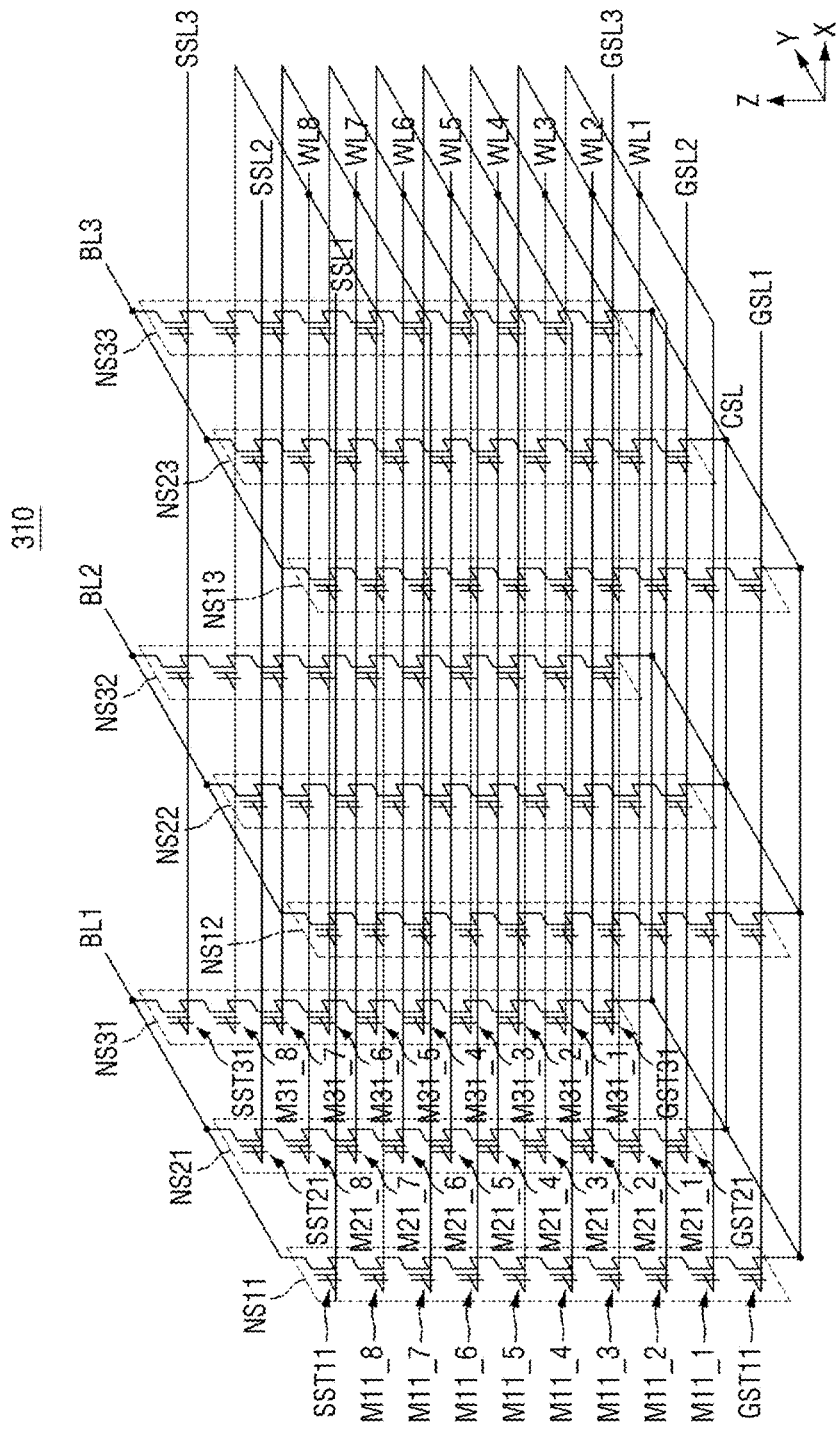
FIG. 6 is a circuit diagram illustrating a memory cell array according to some example embodiments of the present disclosure.

FIG. 6 is a circuit diagram illustrating the memory cell array according to some example embodiments.

Referring to FIG. 6, a plurality of cell strings NS11, NS21, NS31, NS12, NS22, NS32, NS13, NS23, and NS33 may be arranged in a first direction X and a second direction Y on a substrate (not shown). The plurality of cell strings NS11, NS21, NS31, NS12, NS22, NS32, NS13, NS23, and NS33 may have a shape extending in a third direction Z. The plurality of cell strings NS11, NS21, NS31, NS12, NS22, NS32, NS13, NS23, and NS33 may be commonly connected to the substrate (not shown), or a common source line CSL formed in the substrate (not shown). The common source line CSL is illustrated as being connected to a lowermost end of each of the plurality of cell strings NS11, NS21, NS31, NS12, NS22, NS32, NS13, NS23, and NS33 in the third direction Z, but the common source line CSL is not limited to being physically located below the plurality of cell strings NS11, NS21, NS31, NS12, NS22, NS32, NS13, NS23, and NS33 as long as the common source line CSL is electrically connected to the lowermost end of each of the plurality of cell strings NS11, NS21, NS31, NS12, NS22, NS32, NS13, NS23, and NS33 in the third direction Z. In addition, the plurality of cell strings NS11, NS21, NS31, NS12, NS22, NS32, NS13, NS23, and NS33 are illustrated in this drawing as being arranged in a 3×3 matrix, but the arrangement type and the number of the plurality of cell strings arranged in the non-volatile memory cell array 310 are not limited thereto.

Some cell strings NS11, NS12, and NS13 may be connected to a first ground select line GSL1. Some cell strings NS21, NS22, and NS23 may be connected to a second ground select line GSL2. Some cell strings NS31, NS32, and NS33 may be connected to a third ground select line GSL3.

Further, some cell strings NS11, NS12, and NS13 may be connected to a first string select line SSL1. Some cell strings NS21, NS22, and NS23 may be connected to a second string select line SSL2. Some cell strings NS31, NS32, and NS33 may be connected to a third string select line SSL3.

Each of the plurality of cell strings NS11, NS21, NS31, NS12, NS22, NS32, NS13, NS23, and NS33 may include a string select transistor SST connected to each of the string select lines. In addition, each of the plurality of cell strings NS11, NS21, NS31, NS12, NS22, NS32, NS13, NS23, and NS33 may include a ground select transistor GST connected to each of the ground select lines.

One end of the ground select transistor of each of the plurality of cell strings NS11, NS21, NS31, NS12, NS22, NS32, NS13, NS23, and NS33 may be connected to the common source line CSL. In addition, in each of the plurality of cell strings NS11, NS21, NS31, NS12, NS22, NS32, NS13, NS23, and NS33, a plurality of memory cells may be sequentially stacked between the ground select transistor and the string select transistor in the third direction Z. Although not shown in this drawing, each of the plurality of cell strings NS11, NS21, NS31, NS12, NS22, NS32, NS13, NS23, and NS33 may include dummy cells between the ground select transistor and the string select transistor. In addition, the number of string select transistors included in each string is not limited to that illustrated in this drawing.

For example, the cell string NS11 may include a ground select transistor GST11 disposed at the lowermost end in the third direction Z, a plurality of memory cells M11_1 to M11_8 sequentially stacked on the ground select transistor GST11 in the third direction Z, and a string select transistor SST11 stacked on the uppermost memory cell M11_8 in the third direction Z. In addition, the cell string NS21 may include a ground select transistor GST21 disposed at the lowermost end in the third direction Z, a plurality of memory cells M21_1 to M21_8 sequentially stacked on the ground select transistor GST21 in the third direction Z, and a string select transistor SST21 stacked on the uppermost memory cell M21_8 in the third direction Z. In addition, the cell string NS31 may include a ground select transistor GST31 disposed at the lowermost end in the third direction Z, a plurality of memory cells M31_1 to M31_8 sequentially stacked on the ground select transistor GST31 in the third direction Z, and a string select transistor SST31 stacked on the uppermost memory cell M31_8 in the third direction Z. The configurations of other strings may be similar to the above.

The memory cells located at the same height, or a similar height, from the substrate (not shown) or the ground select transistor in the third direction Z may be electrically connected in common to each other through each word line thereof. For example, the memory cells at a height at which the memory cells M 11_1, M 21_1, and M 31_1 are formed may be connected to a first word line WL1. In addition, the memory cells at a height at which the memory cells M 11_2, M 21_2, and M 31_2 are formed may be connected to a second word line WL2. The arrangement and structure of the memory cells connected to third to eighth word lines WL3 to WL8 are similar to the above, and thus descriptions thereof will be omitted.

One end of the string select transistor of each of the plurality of cell strings NS11, NS21, NS31, NS12, NS22, NS32, NS13, NS23, and NS33 may be connected to bit lines BL1, BL2, and BL3. For example, the string select transistors SST11, SST21, and SST31 may be connected to the bit line BL1 extending in the second direction Y. Descriptions of the other string select transistors connected to the bit lines BL2 and BL3 are similar to the above and thus will be omitted.

The memory cells corresponding to one string (or ground) select line and one word line may form one page. A write operation and a read operation may be performed in each page unit. The memory cells of each page may each store two or more bits. The bits written to the memory cells of each page may form logical pages.

The memory cell array 310 may be provided as a three-dimensional memory array. The three-dimensional memory array may be monolithically formed on one or more physical levels of arrays of memory cells having an active area being disposed on the substrate (not shown) and a circuit involved with an operation of memory cells. The circuit involved with the operation of the memory cells may be located in or on the substrate. The expression "the three-dimensional memory array is monolithically formed" means that layers of each level of the three-dimensional array may be directly deposited on layers of a lower level of the three-dimensional memory array. Alternatively, the circuit involved with the operation of the memory cells may be connected to an uppermost contact portion in the third direction Z. This will be described in detail with reference to FIG. 7.

Figure 7:
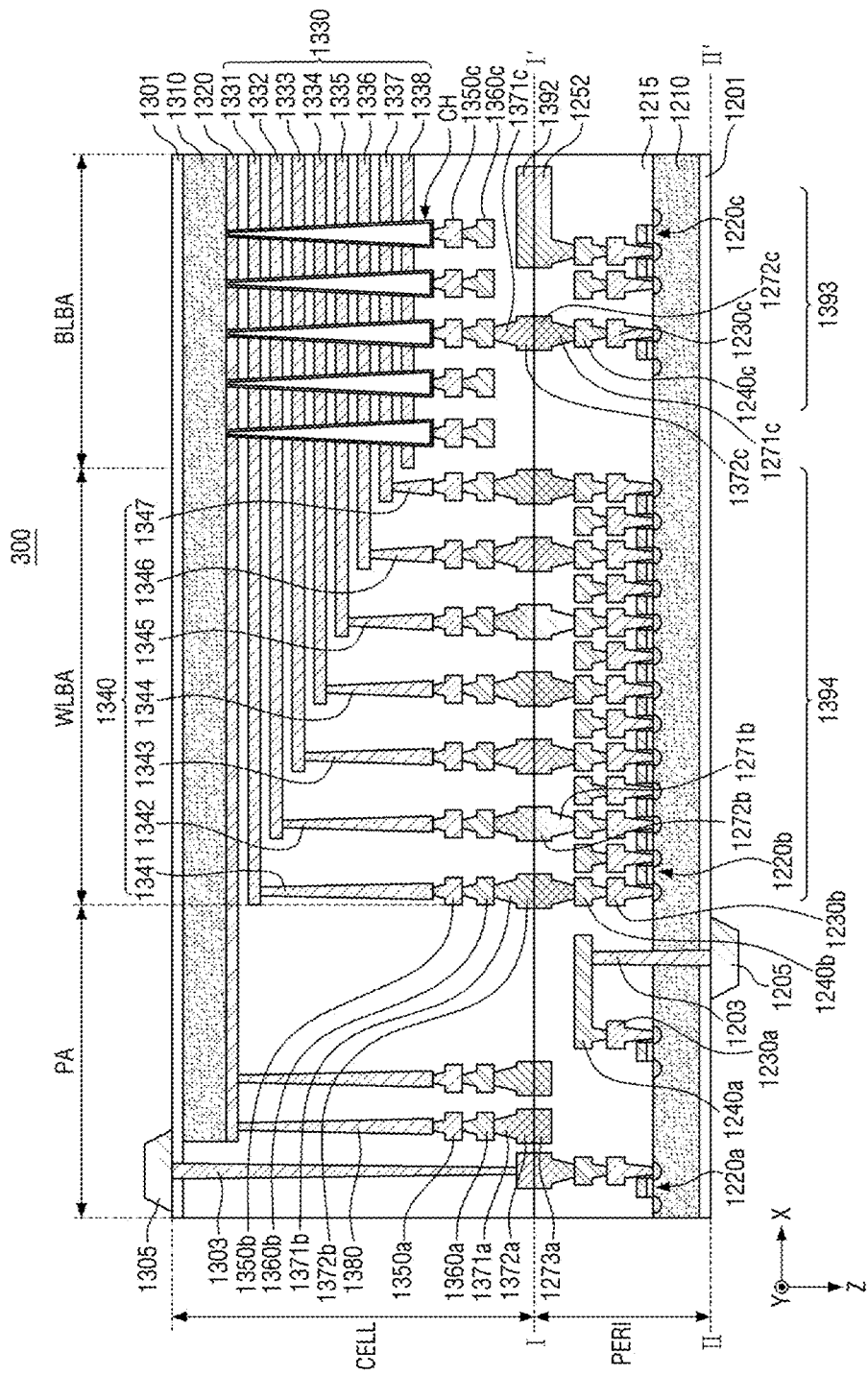
FIG. 7 is a diagram schematically illustrating the inside of the non-volatile memory according to some example embodiments of the present disclosure.

FIG. 7 is a diagram schematically illustrating the inside of the NVM according to some example embodiments.

Referring to FIG. 7, the NVM 300 according to some example embodiments may have a chip-to-chip (C2C) structure. In this drawing, a cell region CELL of the NVM 300 may correspond to the memory cell array 310 of FIG. 5.

The C2C structure may refer to a structure formed by manufacturing an upper chip including the cell region CELL on a first wafer, manufacturing a lower chip including a peripheral circuit region PERI on a second wafer, which is different from the first wafer, and then connecting the upper chip and the lower chip by a bonding method. As an example, the bonding method may include a method of electrically connecting a bonding metal formed on an uppermost metal layer of the upper chip and a bonding metal formed on an uppermost metal layer of the lower chip. For example, when the bonding metals are formed of copper (Cu), the bonding method may be a Cu—Cu bonding, and the bonding metals may also be formed of aluminum or tungsten.

Each of the peripheral circuit region PERI and the cell region CELL of the NVM 300 according to some example embodiments may include an external pad bonding area PA, a word line bonding area WLBA, and/or a bit line bonding area BLBA.

The peripheral circuit region PERI may include a first substrate 1210, an interlayer insulating layer 1215, a plurality of circuit elements 1220a, 1220b, and 1220c formed on the first substrate 1210, first metal layers 1230a, 1230b, and 1230c respectively connected to the plurality of circuit elements 1220a, 1220b, and 1220c, and second metal layers 1240a, 1240b, and 1240c respectively formed on the first metal layers 1230a, 1230b, and 1230c. In some example embodiments, the first metal layers 1230a, 1230b, and 1230c may be formed of tungsten having relatively high resistance, and the second metal layers 1240a, 1240b, and 1240c may be formed of copper having relatively low resistance.

In the present specification, only the first metal layers 1230a, 1230b, and 1230c and the second metal layers 1240a, 1240b, and 1240c are shown and described, but the present disclosure is not limited thereto, and one or more metal layers may be further formed on the second metal layers 1240a, 1240b, and 1240c. At least some of the one or more metal layers formed on the second metal layers 1240a, 1240b, and 1240c may be formed of aluminum or the like having a lower resistance than copper forming the second metal layers 1240a, 1240b, and 1240c.

The interlayer insulating layer 1215 may be disposed on the first substrate 1210 to cover the plurality of circuit elements 1220a, 1220b, and 1220c, the first metal layers 1230a, 1230b, and 1230c, and the second metal layers 1240a, 1240b, and 1240c, and may include an insulating material such as silicon oxide, silicon nitride, or the like.

Lower bonding metals 1271b and 1272b may be formed on the second metal layer 1240b in the word line bonding area WLBA. In the word line bonding area WLBA, the lower bonding metals 1271b and 1272b in the peripheral circuit region PERI may be electrically connected to upper bonding metals 1371b and 1372b in the cell region CELL by a bonding method, and the lower bonding metals 1271b and 1272b and the upper bonding metals 1371b and 1372b may be formed of aluminum, copper, tungsten, or the like.

The cell region CELL may provide at least one memory block. The cell region CELL may include a second substrate 1310 and a common source line 1320 (corresponding to the common source line CSL of FIG. 5). On the second substrate 1310, a plurality of word lines 1331 to 1338 (e.g. 1330, respectively corresponding to the word lines WL1 to WL8 of FIG. 5) may be stacked in the third direction Z that is perpendicular to an upper surface of the second substrate 1310. String select lines and ground select lines may be arranged above and below the plurality of word lines 1330, respectively, and the plurality of word lines 1330 may be disposed between the string select lines and the ground select lines.

In the bit line bonding area BLBA, a channel structure CH may extend in a direction perpendicular to the upper surface of the second substrate 1310, and pass through the plurality of word lines 1330, the string select lines, and the ground select lines. The channel structure CH may include a data storage layer, a channel layer, a buried insulating layer, and the like, and the channel layer may be electrically connected to a first metal layer 1350c and a second metal layer 1360c. For example, the first metal layer 1350c may be a bit line contact, and the second metal layer 1360c may be a bit line (corresponding to the bit lines BL1 to BL3 of FIG. 5). In some example embodiments, the bit line 1360c may extend in the second direction Y that is parallel to the upper surface of the second substrate 1310.

In some example embodiments illustrated in FIG. 7, an area in which the channel structure CH, the bit line 1360c, and the like are disposed may be defined as the bit line bonding area BLBA. In the bit line bonding area BLBA, the bit line 1360c may be electrically connected to the circuit elements 1220c providing a page buffer 1393 in the peripheral circuit region PERI. As an example, the bit line 1360c may be connected to upper bonding metals 1371c and 1372c in the cell region CELL, and the upper bonding metals 1371c and 1372c may be connected to lower bonding metals 1271c and 1272c connected to the circuit elements 1220c of the page buffer 1393.

In the word line bonding area WLBA, the word lines 1330 may extend in the first direction X parallel to the upper surface of the second substrate 1310, and may be connected to a plurality of cell contact plugs 1341 to 1347 (e.g., 1340). The word lines 1330 and the cell contact plugs 1340 may be connected to each other in pads provided by at least some of the word lines 1330 extending in different lengths in the first direction X. A first metal layer 1350b and a second metal layer 1360b may be sequentially connected to an upper portion of each of the cell contact plugs 1340 connected to each of the word lines 1330. The cell contact plugs 1340 may be connected to the peripheral circuit region PERI through the upper bonding metals 1371b and 1372b of the cell region CELL and the lower bonding metals 1271b and 1272b of the peripheral circuit region PERI in the word line bonding area WLBA.

The cell contact plugs 1340 may be electrically connected to the circuit elements 1220b providing a row decoder 1394 in the peripheral circuit region PERI. In some example embodiments, operating voltages of the circuit elements 1220b providing the row decoder 1394 may be different from operating voltages of the circuit elements 1220c providing the page buffer 1393. For example, the operating voltages of the circuit elements 1220c providing the page buffer 1393 may be greater than the operating voltages of the circuit elements 1220b providing the row decoder 1394.

A common source line contact plug 1380 may be disposed in the external pad bonding area PA. The common source line contact plug 1380 may be formed of a conductive material such as a metal, a metal compound, polysilicon, or the like, and may be electrically connected to the common source line 1320. A first metal layer 1350a and a second metal layer 1360a may be sequentially stacked on an upper portion of the common source line contact plug 1380. As an example, an area in which the common source line contact plug 1380, the first metal layer 1350a, and the second metal layer 1360a are disposed may be defined as the external pad bonding area PA.

Meanwhile, input-output pads 1205 and 1305 may be disposed in the external pad bonding area PA. Referring to FIG. 7, a lower insulating film 1201 covering a lower surface of the first substrate 1210 may be formed below the first substrate 1210, and a first input-output pad 1205 may be formed on the lower insulating film 1201. The first input-output pad 1205 may be connected to at least one of the plurality of circuit elements 1220a, 1220b, and 1220c disposed in the peripheral circuit region PERI through a first input-output contact plug 1203, and may be separated from the first substrate 1210 by the lower insulating film 1201. In addition, a side insulating film may be disposed between the first input-output contact plug 1203 and the first substrate 1210 to electrically separate the first input-output contact plug 1203 and the first substrate 1210.

With continued reference to FIG. 7, an upper insulating film 1301 covering the upper surface of the second substrate 1310 may be formed on the second substrate 1310, and a second input-output pad 1305 may be disposed on the upper insulating film 1301. The second input-output pad 1305 may be connected to at least one of the plurality of circuit elements 1220a, 1220b, and 1220c disposed in the peripheral circuit region PERI through a second input-output contact plug 1303.

According to some example embodiments, the second substrate 1310 and the common source line 1320 may not be disposed in an area in which the second input-output contact plug 1303 is disposed. In addition, the second input-output pad 1305 may not overlap the word lines 1330 in the third direction Z. Referring to FIG. 7, the second input-output contact plug 1303 may be separated from the second substrate 1310 in a direction parallel to the upper surface of the second substrate 1310, and may pass through the interlayer insulating layer 1215 of the cell region CELL to be connected to the second input-output pad 1305.

According to some example embodiments, the first input-output pad 1205 and the second input-output pad 1305 may be selectively formed. As an example, the NVM 300 according to some example embodiments may include only the first input-output pad 1205 disposed above the first substrate 1210 or the second input-output pad 1305 disposed above the second substrate 1310. Alternatively, the NVM 300 may include both the first input-output pad 1205 and the second input-output pad 1305.

In each of the external pad bonding area PA and the bit line bonding area BLBA, respectively included in the cell region CELL and the peripheral circuit region PERI, a metal pattern in an uppermost metal layer may be provided as a dummy pattern or the uppermost metal layer may be absent.

In the external pad bonding area PA, the NVM 300 according to some example embodiments may include a lower metal pattern 1273a, which corresponds to an upper metal pattern 1371a and 1372a formed in an uppermost metal layer of the cell region CELL and has the same shape as, or a similar shape to, the upper metal pattern 1372a of the cell region CELL, in an uppermost metal layer of the peripheral circuit region PERI. In the peripheral circuit region PERI, the lower metal pattern 1273a formed in the uppermost metal layer of the peripheral circuit region PERI may not be connected to a separate contact. Similarly, in the external pad bonding area PA, an upper metal pattern, which corresponds to the lower metal pattern formed in the uppermost metal layer of the peripheral circuit region PERI and has the same shape as, or a similar shape to, a lower metal pattern of the peripheral circuit region PERI, may be formed in the uppermost metal layer of the cell region CELL.

The lower bonding metals 1271b and 1272b may be formed on the second metal layer 1240b in the word line bonding area WLBA. In the word line bonding area WLBA, the lower bonding metals 1271b and 1272b of the peripheral circuit region PERI may be electrically connected to the upper bonding metals 1371b and 1372b of the cell region CELL by a bonding method.

Further, in the bit line bonding area BLBA, an upper metal pattern 1392, which corresponds to a lower metal pattern 1252 formed in the uppermost metal layer of the peripheral circuit region PERI and has the same shape as, or a similar shape to, the lower metal pattern 1252 of the peripheral circuit region PERI, may be formed in the uppermost metal layer of the cell region CELL. A contact may not be formed on the upper metal pattern 1392 formed in the uppermost metal layer of the cell region CELL.

Figure 8:
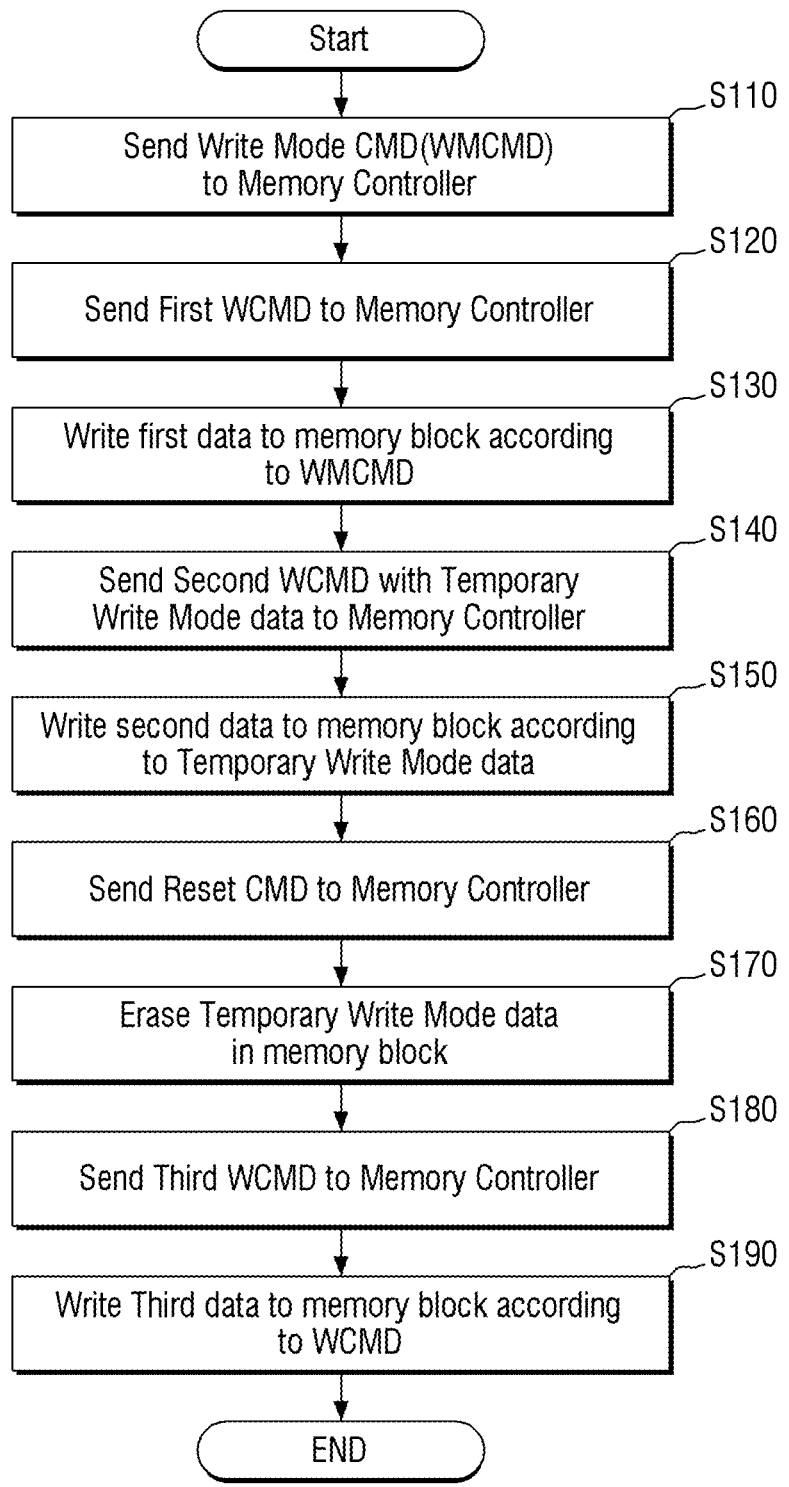
FIGS. 8 and 9 are diagrams for describing a method of operating the storage device according to some example embodiments of the present disclosure.
Figure 9:
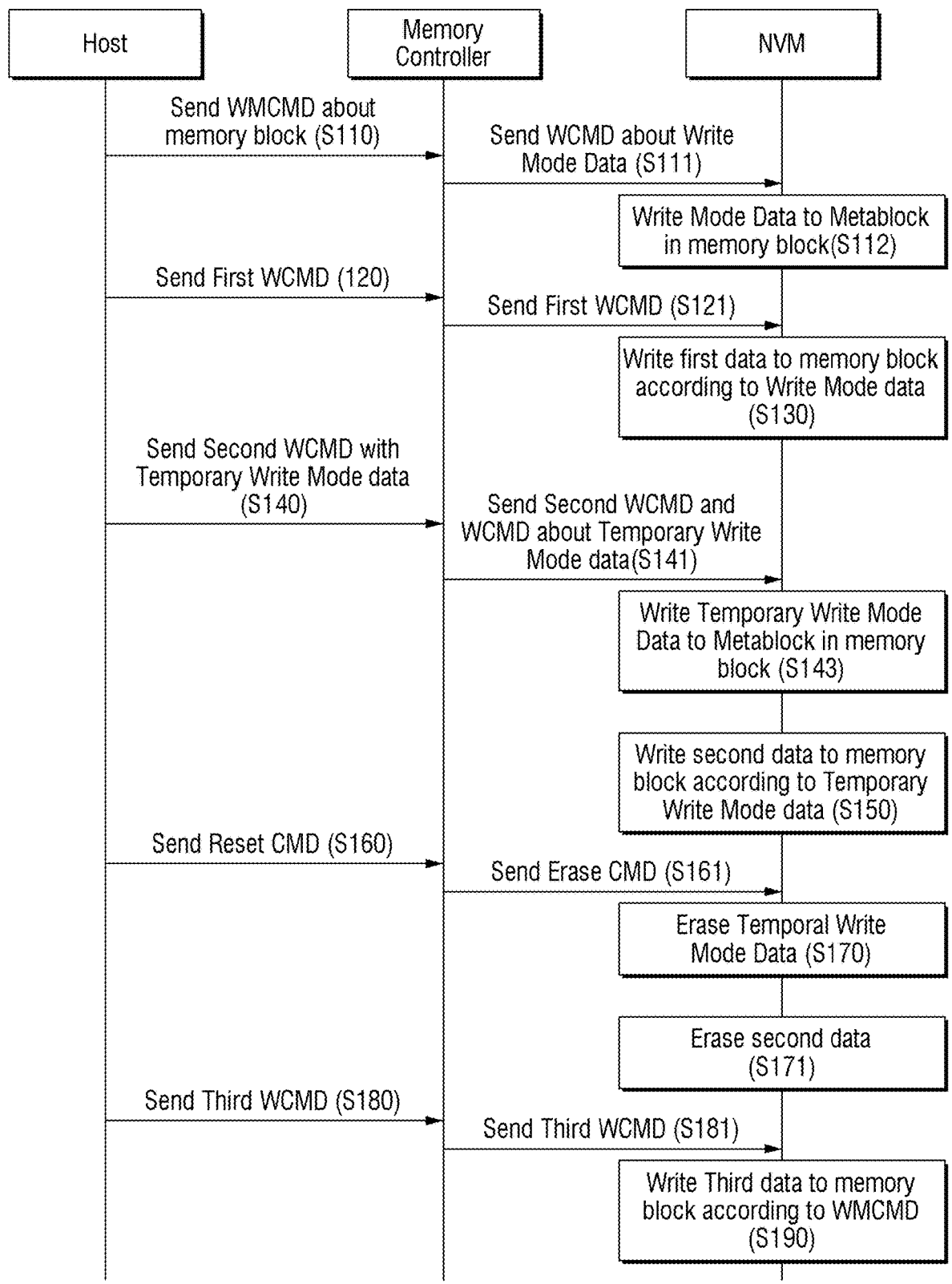

FIGS. 8 and 9 are diagrams for describing a method of operating the storage device 10 according to some example embodiments of the present disclosure.

Referring to FIGS. 2, 8, and 9, the host device 100 may send the write mode command WMCMD to the memory controller 200 (S110). The memory controller 200 may send a write command about write mode data to the NVM 300 after receiving the write mode command WMCMD (S111). The write mode data may be written to each of the memory blocks BLK 0 to BLK N (see FIG. 2) in the NVM 300 (S112).

Figure 10:
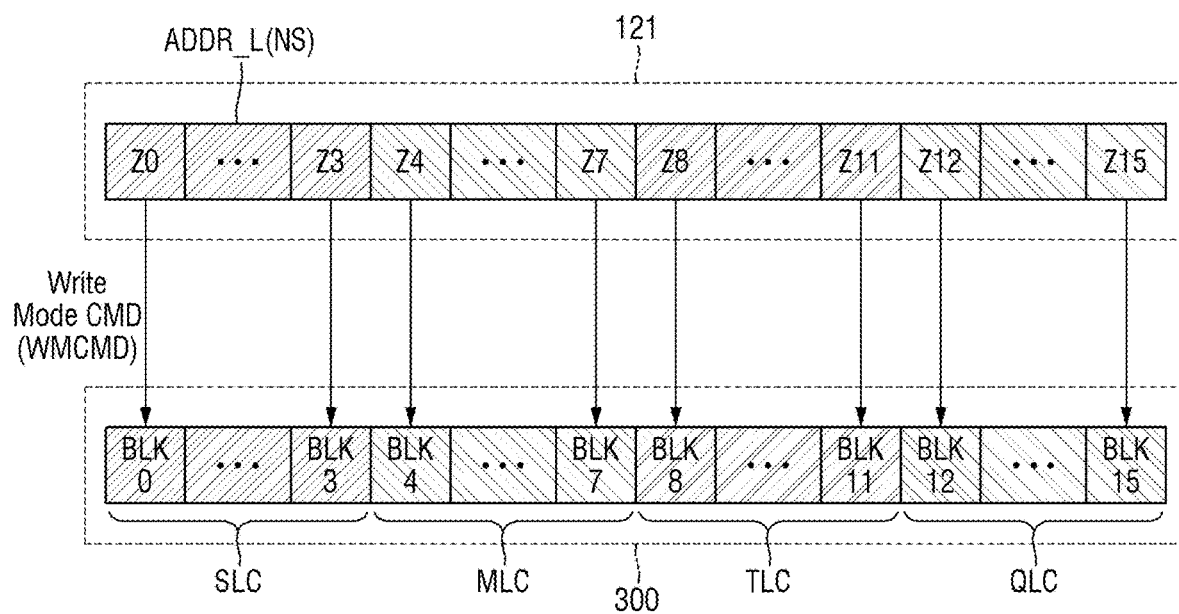
FIG. 10 is a diagram for describing a file system and memory blocks used in the electronic system according to some example embodiments of the present disclosure.
Figure 11:
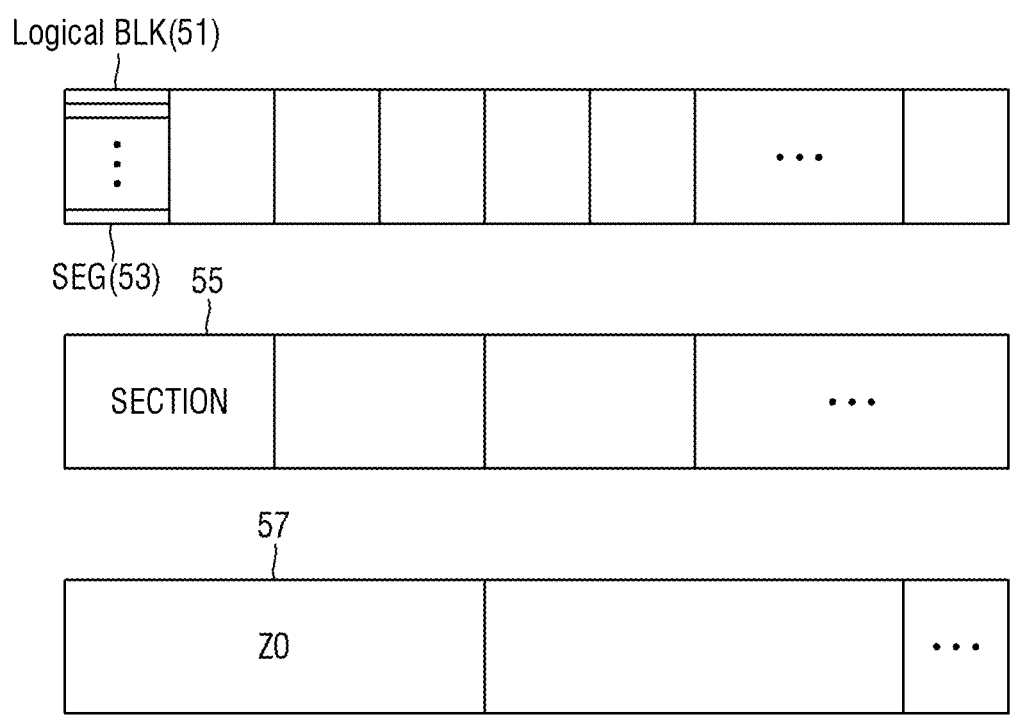
FIG. 11 is a diagram for describing zones in the file system used in the electronic system according to some example embodiments of the present disclosure.
Figure 12:
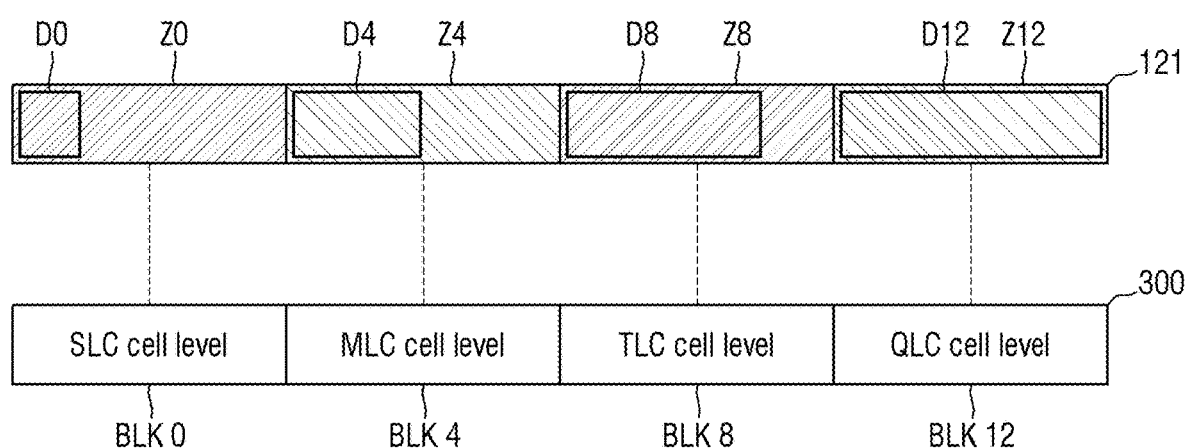
FIGS. 12 and 13 are diagrams for describing operation modes of the memory blocks in the storage device according to some example embodiments of the present disclosure.
Figure 13:
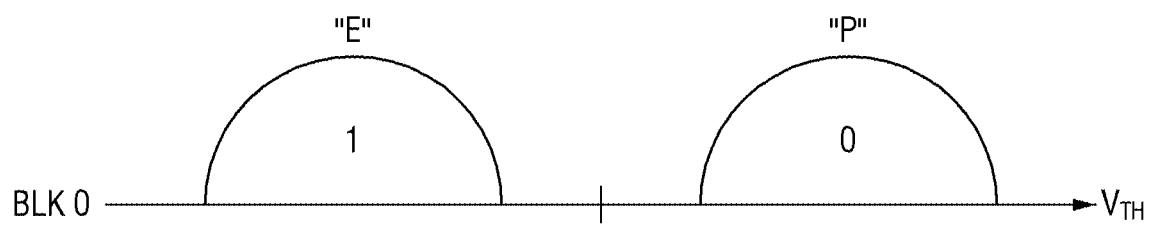
Figure 13:
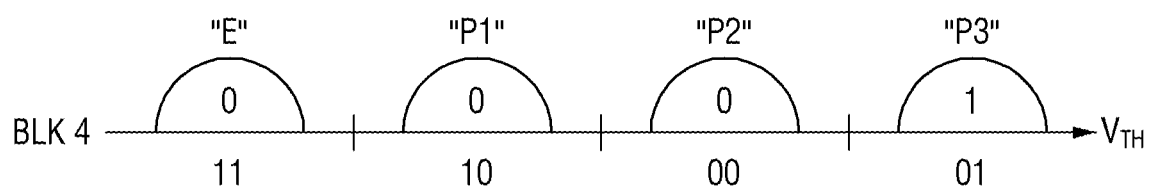

FIG. 10 is a diagram for describing the file system and the memory blocks used in the electronic system according to some example embodiments of the present disclosure. FIG. 11 is a diagram for describing zones in the file system used in the electronic system according to some example embodiments of the present disclosure. FIGS. 12 and 13 are diagrams for describing operation modes of the memory blocks in the storage device according to some example embodiments of the present disclosure.

Referring additionally to FIGS. 10 to 13, the logical address ADDR_L that may be controlled by the file system 121 may be implemented as one or a plurality of namespaces NS or the like.

The logical address ADDR_L may include a plurality of zones Z0 to Z15. The file system 121 may program the NVM 300 through the plurality of zones Z0 to Z15. The number of zones included in the logical address ADDR_L, which is illustrated in this drawing, is an example and is not limited to that in this drawing.

Referring to FIG. 11, each of the zones Z0 to Z15 (e.g., zones 57) may include a plurality of sections 55, each of the sections 55 may include a plurality of segments 53, and each of the segments 53 may include a plurality of logical blocks 51. For example, the logical block 51 may be 4 Kbytes, and the segment 53 including 512 blocks 51 may be 2 Mbytes. However, the size of each of the sections 55 and the size of each of the zones Z0 to Z15 may be defined according to the file system 121, and data to be stored may also vary according to the characteristics of each of the zones Z0 to Z15. In particular, the logical block 51 may correspond to the page of the NVM 300.

The zones Z0 to Z15 may correspond to the plurality of memory blocks BLK 0 to BLK 15, respectively, and the corresponding relationship may be defined by the address mapping table 223 of FIG. 3. The address mapping table 223 may be updated under the control by the wear-leveling manager module 221 (see FIG. 3) and the file system 121.

A 0th zone Z0 corresponds to a 0th memory block BLK 0, a first zone Z1 corresponds to a first memory block BLK 1, a second zone Z2 corresponds to a second memory block BLK 2, and a third zone Z3 corresponds to a third memory block BLK 3. A fourth zone Z4 corresponds to a fourth memory block BLK 4, a fifth zone Z5 corresponds to a fifth memory block BLK 5, a sixth zone Z6 corresponds to a sixth memory block BLK 6, and a seventh zone Z7 corresponds to a seventh memory block BLK 7. An eighth zone Z8 corresponds to an eighth memory block BLK 8, a ninth zone Z9 corresponds to a ninth memory block BLK 9, a tenth zone Z10 corresponds to a tenth memory block BLK 10, and an eleventh zone Z11 corresponds to an eleventh memory block BLK 11. A twelfth zone Z12 corresponds to a twelfth memory block BLK 12, a thirteenth zone Z13 corresponds to a thirteenth memory block BLK 13, a fourteenth zone Z14 corresponds to a fourteenth memory block BLK 14, and a fifteenth zone Z15 corresponds to a fifteenth memory block BLK 15.

In addition to the case in which one memory block corresponds to one zone as in this drawing, in the electronic system according to some example embodiments of the present disclosure, a plurality of memory blocks may correspond to one zone, and the number of memory blocks in this drawing is an example and is not limited to that in this drawing.

Through the operation of sending the write mode command WMCMD by the host device 100 (S110), the memory controller 200 may write the write mode data to each of the blocks BLK 0 to BLK 15 in the NVM 300.

According to some example embodiments, the 0th to third memory blocks BLK 0 to BLK 3 store write mode data corresponding to a single-level cell (SLC) write mode, the fourth to seventh memory blocks BLK 4-BLK 7 store write mode data corresponding to a multi-level cell (MLC) write mode, the eighth to eleventh memory blocks BLK 8 to BLK 11 store write mode data corresponding to a triple-level cell (TLC) write mode, and the twelfth to fifteenth memory blocks BLK 12 to BLK 15 store write mode data corresponding to a quadruple-level cell (QLC) write mode.

In the electronic system 1a according to some example embodiments of the present disclosure, when the write mode of each memory block is set according to the write mode command WMCMD, each memory block may be fixedly programmed according to the write mode data of the write mode command WMCMD unless the write mode is changed by the command of the host device 100.

The host device 100 may set a default write mode on each memory block by sending the write mode command WMCMD for each of the memory blocks BLK 0 to BLK 15. According to some example embodiments, the host sends a plurality of write mode commands WMCMDs respectively corresponding to each of the memory blocks BLK 0 to BLK 15. According to some example embodiments, each of the memory blocks BLK 0 to BLK 15 may be fixedly programmed according to the write mode data of a respective write mode command WMCMD among the plurality of write mode commands WMCMDs.

In each of the memory blocks BLK 0 to BLK 15 according to some example embodiments, the default write mode may be set by formatting or initializing the electronic system 1a instead of receiving the write mode command WMCMD.

Referring to FIGS. 12 and 13, according to some example embodiments, the 0th memory block BLK 0 corresponding to the 0th zone Z0 stores 0th data D0 of the 0th zone Z0 according to the SLC write mode, the fourth memory block BLK 4 corresponding to the fourth zone Z4 stores fourth data D4 of the fourth zone Z4 according to the MLC write mode, the eighth memory block BLK 8 corresponding to the eighth zone Z8 stores eighth data D8 of the eighth zone Z8 according to the TLC write mode, and the twelfth memory block BLK 12 corresponding to the twelfth zone Z12 stores twelfth data D12 of the eighth zone Z8 according to the QLC write mode.

For convenience of description, the MLC write mode, the TLC write mode, and the QLC write mode are collectively referred to as a multiple level cell write mode.

When a write operation is performed according to the multiple level cell write mode, the number of bits of data that a unit memory cell may store increases, thereby increasing a storage capacity of each of the memory blocks. On the other hand, when the memory block performs the write operation according to the SLC write mode, the unit memory cell may store only one bit of data, and thus the storage capacity of the memory block may be reduced as compared to the case in which the write operation is performed according to the multiple level cell write mode, but a write or read speed is faster and the reliability of the data is increased.

The SLC in the 0th memory block BLK 0 has 1-bit data, and may have one state of (e.g., among) an erase state "E" and/or a program state "P". The MLC in the fourth memory block BLK 4 has 2-bit data, and may have one state of (e.g., among) an erase state "E", a first program state "P1", a second program state "P2", and/or a third program state "P3". The TLC in the eighth memory block BLK 8 has 3-bit data and has one state of (e.g., among) an erase state "E" and/or first to seventh program states, and the QLC in the twelfth memory block BLK 12 has 4-bit data and has one state of (e.g., among) an erase state "E" and/or first to fifteenth program states.

Accordingly, the fourth data D4 has a storage capacity twice that of the 0th data D0, the eighth data D8 has a storage capacity three times that of the 0th data D0, and the 12th data D12 has a storage capacity four times that of the 0th data D0.

The first to third memory blocks BLK 1 to BLK 3 of FIG. 10 each correspond to the 0th memory block BLK 0, and the first to third zones Z1 to Z3 of FIG. 10 each correspond to the 0th zone Z0. The fifth to seventh memory blocks BLK 5 to BLK 7 of FIG. 10 each correspond to the fourth memory block BLK 4, and the fifth to seventh zones Z5 to Z7 of FIG. 10 each correspond to the fourth zone Z4. The ninth to eleventh memory blocks BLK 9 to BLK 11 of FIG. 10 each correspond to the eighth memory block BLK 8, and the ninth to eleventh zones Z9 to Z11 of FIG. 10 each correspond to the eighth zone Z8. The thirteenth to fifteenth memory blocks BLK 13 to BLK 15 of FIG. 10 each correspond to the twelfth memory block BLK 12, and the thirteenth to fifteenth zones Z13 to Z15 of FIG. 10 each correspond to the twelfth zone Z12, and thus descriptions thereof may be replaced with the descriptions of the 0th memory block BLK 0, the fourth memory block BLK 4, the eighth memory block BLK 8, the twelfth memory block BLK 12, the 0th zone Z0, the fourth zone Z4, the eighth zone Z8, and the twelfth zone Z12.

Referring to FIGS. 8 and 9 again, after the operation of writing the write mode date (S112), the host device 100 may send a first write command about first data to the memory controller 200 (S120). Upon receipt of the first write command, the memory controller 200 may send the first write command about the first data to the NVM 300 (S121). The NVM 300 may write the first data to the memory block according to the write mode data (S130).

Figure 14:
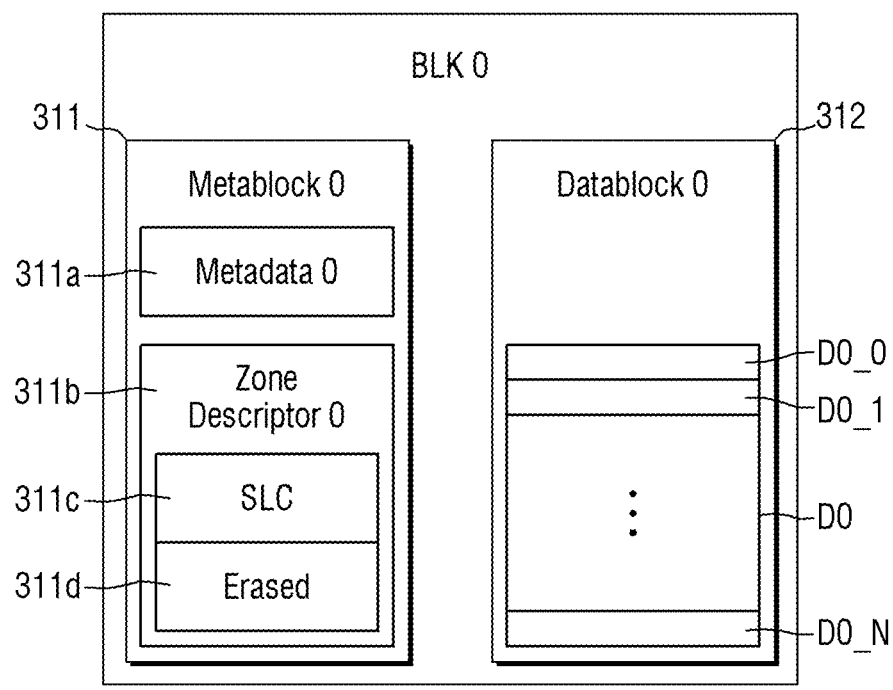
FIGS. 14 to 16 are diagrams for describing a method of storing data in the memory block in the storage device according to some example embodiments of the present disclosure.
Figure 15:
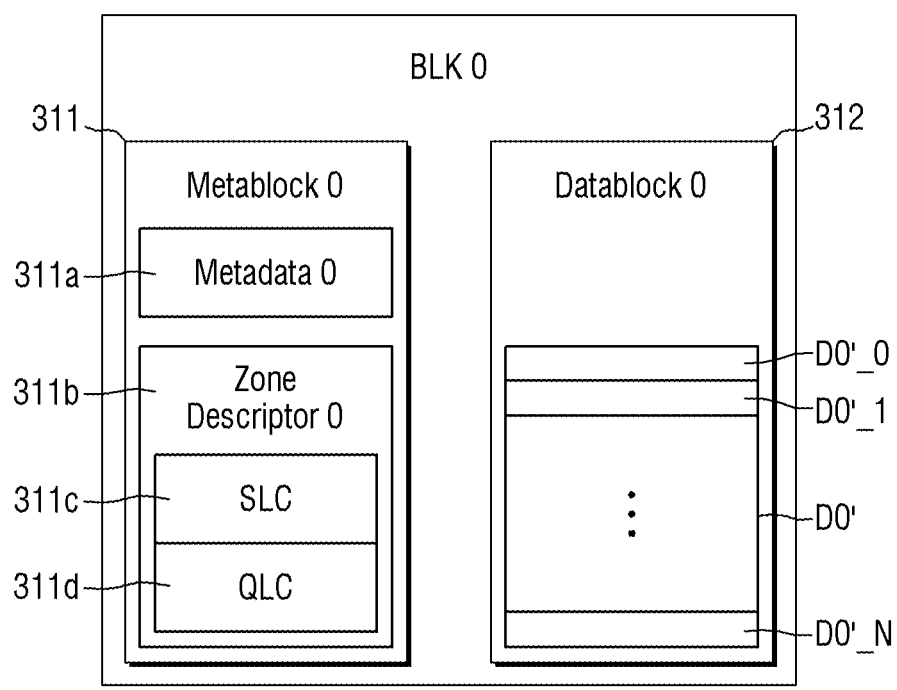
Figure 16:
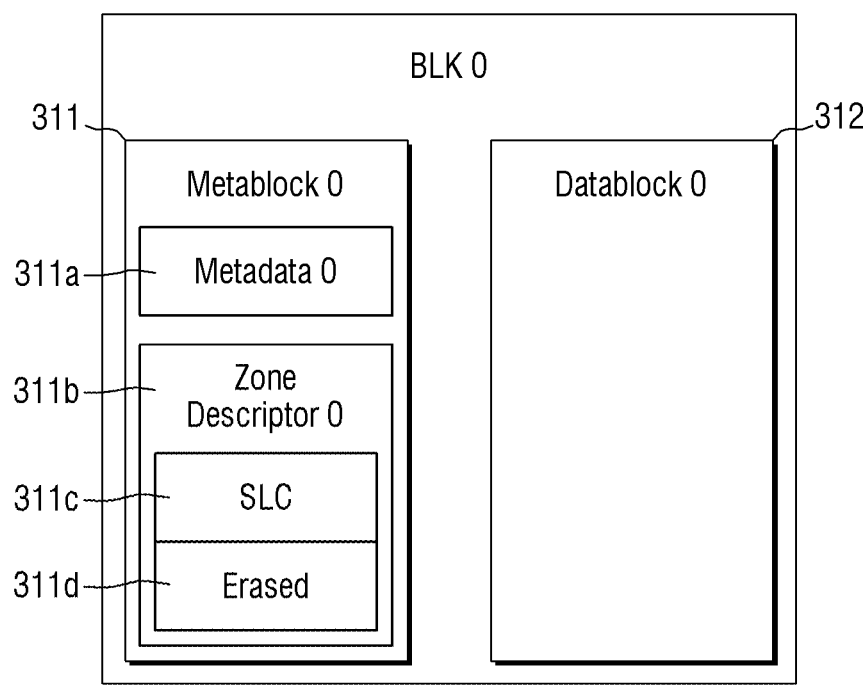

FIGS. 14 to 16 are diagrams for describing a method of storing data in the memory block in the storage device according to some example embodiments of the present disclosure.

Referring to FIG. 14, the 0th memory block BLK 0 may include a 0th meta block 311 and/or a 0th data block 312.

After operation S130, the 0th data block 312 may store the 0th data D0 including contents of a file or data to be stored in the file system 121, and the 0th meta block 311 may store 0th meta data 311a including attributes of the 0th data D0, a location of the block in which the 0th data D0 is stored, and/or the like, and a 0th zone descriptor 311b.

In the 0th zone descriptor 311b, zone characteristics for the 0th zone Z0 (see FIG. 10), default write mode data 311c for the 0th data block 312, temporary write mode data 311d, and/or whether to write sequentially or not may be stored.

Referring to FIG. 10 together, in the 0th zone descriptor 311b, SLC write mode data may be stored as the default write mode data 311c, and the temporary write mode data 311d may have an erase state.

In the 0th data block 312 in the NVM 300 according to some example embodiments of the present disclosure, the 0th data D0 may be written according to the SLC write mode data, which is the default write mode data 311c.

Further, the 0th data D0 may be written by a sequential write method, and whether the 0th data D0 is sequentially written may be determined by the 0th zone descriptor 311b. Accordingly, depending on some example embodiments, 0th_0th data D0_0 and 0th_1st to 0th_Nth data D0_1 to D0_N included in the 0th data D0 may be sequentially written to the 0th data block 312.

Referring to FIGS. 8 and 9 again, after the operation of writing the first data (S130), the host device 100 may send a second write command about second data together with temporary write mode data to the memory controller 200 (S140). Upon receipt of the second write command, the memory controller 200 may send the second write command and a write command about the temporary write mode data to the NVM 300 (S141). The NVM 300 may write the temporary write mode data to the memory block (S143). The NVM 300 may write the second data on the memory block according to the temporary write mode data (S150).

Referring to FIGS. 14 and 15, after operation S150, the 0th zone descriptor 311b may have multiple level cell write mode data as the temporary write mode data 311d, and as an example, may have QLC write mode data.

In the 0th data block 312 in the NVM 300 according to some example embodiments of the present disclosure, 0'th data D0' may be written according to the QLC write mode data, which is the temporary write mode data 311d, and the write operation may be performed in a sequential write manner.

Accordingly, depending on some example embodiments, 0'th_0th data D0'_0 and 0'th_1st to 0'th_Nth data D0'_1 to D0'_N included in the 0'th data D0' may be sequentially written to the 0th data block 312. In comparison with FIG. 14, since the write operation is performed according to the QLC write mode, the storage capacity of the 0'th data D0' may correspond to four times the storage capacity of the 0th data D0.

Referring to FIGS. 8 and 9 again, after the operation of writing the second data (S150), the host device 100 may send a reset command to the memory controller 200 (S160). Upon receipt of the reset command, the memory controller 200 may send an erase command to the NVM 300 (S161). The NVM 300 may erase the temporary write mode data from the memory block (S170). The NVM 300 may erase the second data from the memory block (S171).

Referring to FIG. 16, after operation S171, in the 0th zone descriptor 311b, SLC write mode data may be stored as the default write mode data 311c, and the temporary write mode data 311d may have an erase state.

The default write mode data 311c in the 0th meta block 311 according to some example embodiments may be changed by the command of the host device 100, or by formatting or initializing the electronic system 1a.

Referring to FIGS. 8 and 9 again, after operation S171, the host device 100 may send a third write command about third data to the memory controller 200 (S180). Upon receipt of the third write command, the memory controller 200 may send the third write command about the third data to the NVM 300 (S181). The NVM 300 may write the third data to the memory block according to the write mode data (S190).

Operations S180, S181, and S190 may correspond to operations S120, S121, and S130, respectively, and in particular, the write operation of the third data may be performed according to the write mode data of the write mode command WMCMD like the write operation of the first data (S190).

Each of the first to third memory blocks BLK 1 to BLK 3 may operate in the same manner as, or a similar manner to, the 0th memory block BLK 0, and each of the first to third zones Z1 to Z3 may operate in the same manner as, or a similar manner to, the 0th zone Z0, and thus descriptions of the operation of each of the first to third memory blocks BLK 1 to BLK 3 and the operation of each of the first to third zones Z1 to Z3 may be respectively replaced with the descriptions of the operation of the 0th memory block BLK 0 and the operation of the 0th zone Z0.

Similarly, each of the fourth to seventh memory blocks BLK 4 to BLK 7 and each of the fourth to seventh zones Z4 to Z7 may respectively correspond to each of the 0th to third memory blocks BLK 0 to BLK 3 and each of the 0th to third zones Z0 to Z3.

When compared with each of the 0th to third memory blocks BLK 0 to BLK 3 and each of the 0th to third zones Z0 to Z3, each of the fourth to seventh memory blocks BLK 4 to BLK 7 and each of the fourth to seventh zones Z4 to Z7 may operate in the same manner as, or a similar manner to, each of the 0th to third memory blocks BLK 0 to BLK 3 and each of the 0th to 3rd zones Z0 to Z3 except that, in each of the fourth to seventh memory blocks BLK 4 to BLK 7, the default write mode data is MLC write mode data, and the temporary write mode data is one of SLC write mode data, TLC write mode data, and QLC write mode data except for the MLC write mode data. Thus, descriptions of the operation of each of the fourth to seventh memory blocks BLK 4 to BLK 7 and the operation of each of the fourth to seventh zones Z4 to Z7 may be respectively replaced with the descriptions of the operation of each of the 0th to third memory blocks BLK 0 to BLK 3 and the operation of each of the 0th to third zones Z0 to Z3.

Similarly, each of the eighth to eleventh memory blocks BLK 8 to BLK 11 and each of the eighth to eleventh zones Z8 to Z11 may respectively correspond to each of the 0th to third memory blocks BLK 0 to BLK 3 and each of the 0th to third zones Z0 to Z3.

When compared with each of the 0th to third memory blocks BLK 0 to BLK 3 and each of the 0th to third zones Z0 to Z3, each of the eighth to eleventh memory blocks BLK 8 to BLK 11 and each of the eighth to eleventh zones Z8 to Z11 may operate in the same manner as, or a similar manner to, each of the 0th to third memory blocks BLK 0 to BLK 3 and each of the 0th to third zones Z0 to Z3 except that, in each of the eighth to eleventh memory blocks BLK 8 to BLK 11, the default write mode data is TLC write mode data, and the temporary write mode data is one of SLC write mode data, MLC write mode data, and QLC write mode data except for the TLC write mode data. Thus, descriptions of the operation of each of the eighth to eleventh memory blocks BLK 8 to BLK 11 and the operation of each of the eighth to eleventh zones Z8 to Z11 may be respectively replaced with the descriptions of the operation of each of the 0th to third memory blocks BLK 0 to BLK 3 and the operation of each of the 0th to third zones Z0 to Z3.

Similarly, each of the twelfth to fifteenth memory blocks BLK 12 to BLK 15 and each of the twelfth to fifteenth zones Z12 to Z15 may respectively correspond to each of the 0th to third memory blocks BLK 0 to BLK 3 and each of the 0th to third zones Z0 to Z3.

When compared with each of the 0th to third memory blocks BLK 0 to BLK 3 and each of the 0th to third zones Z0 to Z3, each of the twelfth to fifteenth memory blocks BLK 12 to BLK 15 and each of the twelfth to fifteenth zones Z12 to Z15 may operate in the same manner as, or a similar manner to, each of the 0th to third memory blocks BLK 0 to BLK 3 and each of the 0th to third zones Z0 to Z3 except that, in the twelfth to fifteenth memory blocks BLK 12 to BLK 15, the default write mode data is QLC write mode data, and the temporary write mode data is one of SLC write mode data, MLC write mode data, and TLC write mode data except for the QLC write mode data. Thus, descriptions of the operation of each of the twelfth to fifteenth memory blocks BLK 12 to BLK 15 and the operation of each of the twelfth to fifteenth zones Z12 to Z15 may be respectively replaced with the descriptions of the operation of each of the 0th to third memory blocks BLK 0 to BLK 3 and the operation of each of the 0th to third zones Z0 to Z3.

Figure 17:
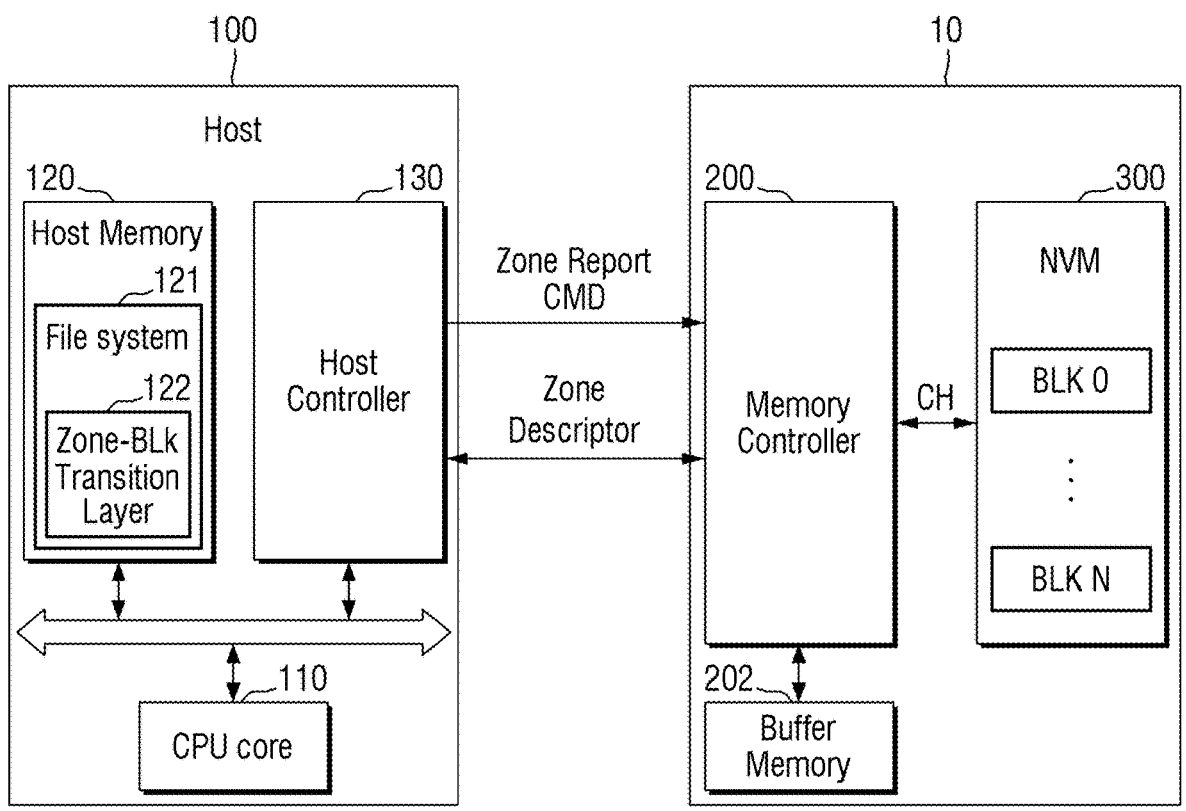

FIGS. 17 and 18 are diagrams for describing a method of determining an operation mode in the electronic system according to some example embodiments of the present disclosure.

Referring to FIGS. 17 and 18, the host device 100 may send a zone report command to the memory controller 200

Upon receipt of the zone report command, the memory controller 200 may provide zone descriptors 311*b*0 to 311*b*15, respectively corresponding to the memory blocks BLK 0 to BLK 15, and a zone descriptor header 311*bh* to the host device 100.

The zone descriptor header 311*bh* may include data on the number of times a report is provided to the host device 100, and a wear level or usage rate for each write mode, and each of the zone descriptors 311*b*0 to 311*b*15 may include default write mode data and temporary write mode data of each of the memory blocks BLK 0 to BLK 15.

FIG. 19 is a diagram for describing an operation of the electronic system according to some example embodiments of the present disclosure.

When the frequency of use of the 0th data D0 in the 0th zone Z0 is high (Hot), the file system 121 of the host device 100 may set such that a write operation of the 0th memory block BLK 0 is performed according to an SLC write mode or an MLC write mode. When the frequency of use of the 0th data D0 in the 0th zone Z0 is medium (Warm), the file system 121 of the host device 100 may set such that the write operation of the 0th memory block BLK 0 is performed according to an MLC write mode or a TLC write mode. When the frequency of use of the 0th data D0 in the 0th zone Z0 is low (Cold), the file system 121 of the host device 100 may set such that the write operation of the 0th memory block BLK 0 is performed according to a TLC write mode or a QLC write mode. The method of setting the above may be provided through the default write mode data or the temporary write mode data.

The description of FIG. 19 is equally or similarly applicable to each of the first to fifteenth zones Z1 to Z15 and each of the first to fifteenth memory blocks BLK 1 to BLK 15.

Figure 20:
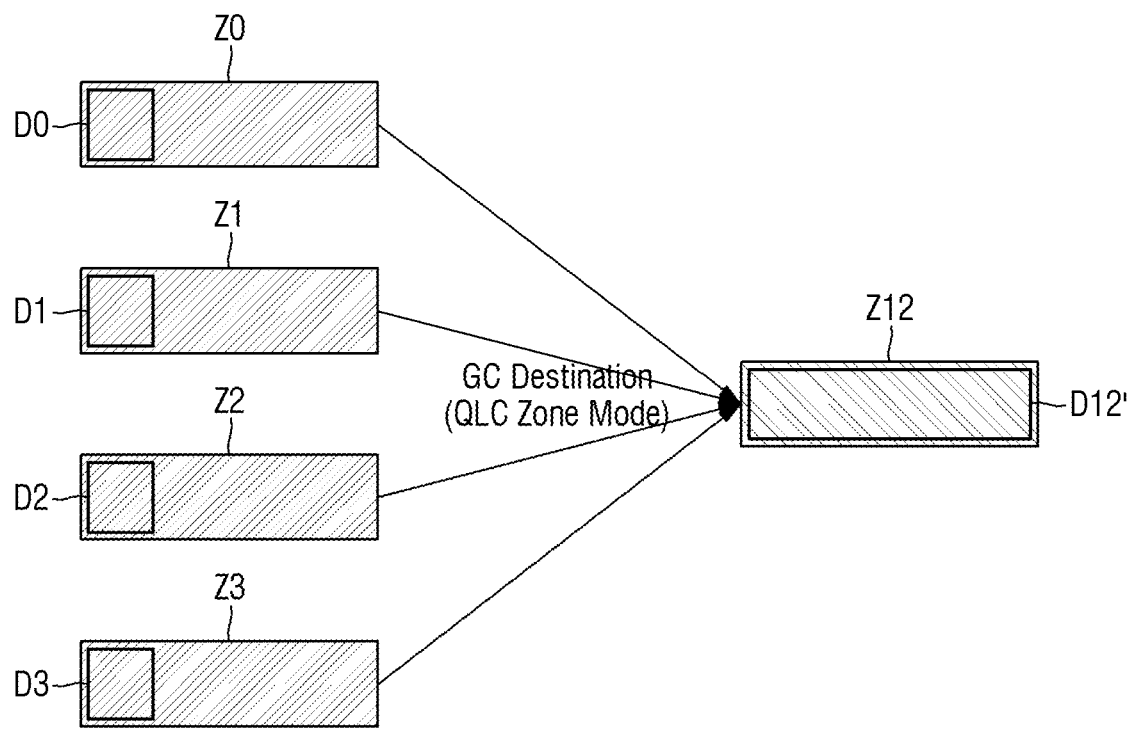
FIG. 20 is a diagram for describing a garbage collection operation of the electronic system according to some example embodiments of the present disclosure.

FIG. 20 is a diagram for describing a garbage collection operation of the electronic system according to some example embodiments of the present disclosure.

Referring to FIG. 20, in the file system 121 in the electronic system according to some example embodiments, the twelfth zone Z12 becomes a garbage collection destination zone for the 0th to third zones Z0 to Z3, so that the 0th to third data D0 to D3 may be garbage collected to 12'th data D12'.

Referring to FIG. 12 together, when it is assumed that the 0th to 15th zones Z0 to Z15 have the same size or similar sizes, the 0th to third memory blocks BLK 0 to BLK 3 respectively corresponding to 0th to third zones Z0 to Z3 may perform a write operation of an SLC write mode, and the twelfth memory block BLK 12 corresponding to the twelfth zone Z12 may perform a write operation of a QLC write mode, it is possible to perform garbage collection on the 0th to third zones Z0 to Z3 with the twelfth zone Z12 because the size of each of the 0th to third data D0 to D3 stored in each of the 0th to third zones Z0 to Z3 is a ¼ of a storage capacity of the twelfth zone Z12.

The twelfth zone Z12 in which writing is performed according to a QLC write mode is one example of the garbage collection destination zone, and depending on some example embodiments, the garbage collection may be performed on the 0th to third zones Z0 to Z3, in which writing is performed according to an SLC write mode, with a zone in which writing is performed according to an MLC write mode or a TLC write mode.

Figure 21:
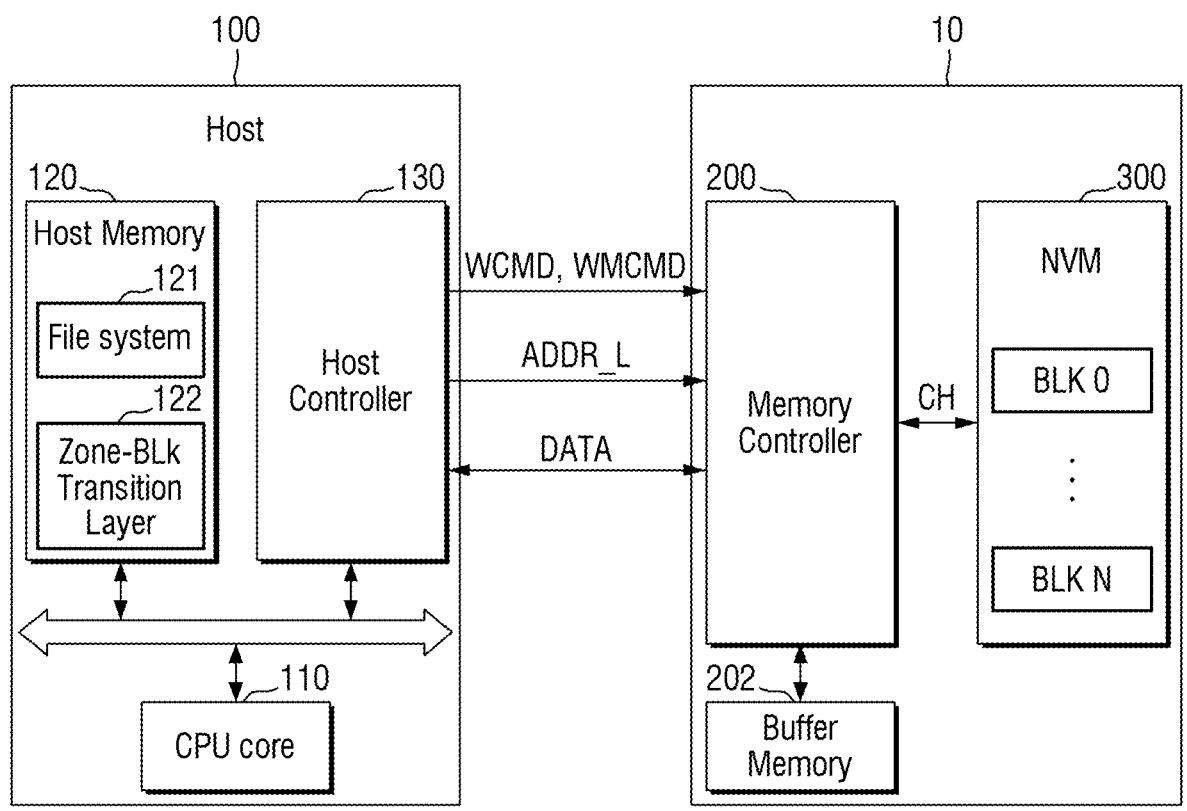
FIG. 21 is a block diagram for describing an electronic system including a storage device according to some example embodiments of the present disclosure.

FIG. 21 is a block diagram for describing an electronic system including a storage device according to some example embodiments of the present disclosure.

Hereinafter, an electronic system 1b according to some example embodiments of the present disclosure will be described with reference to FIG. 21. The difference between the electronic system 1a shown in FIG. 2 and the electronic system 1b will be mainly described.

As compared to FIG. 2, a zone-memory block transition layer 122 may be separated from a file system 121. The file system 121 may be used in accordance with a specific operating system being executed in a host device 100, and the operating system may not support execution of files or data in units of zones.

Accordingly, in the electronic system 1b according to some example embodiments, a host memory 120 may drive the zone-memory block transition layer 122 separately from the file system 121, and provide a command (e.g., the write command WCMD or read command) of the file system 121, and a logical address ADDR_L according to the command, to a storage device 10 through the zone-memory block transition layer 122.

Figure 22:
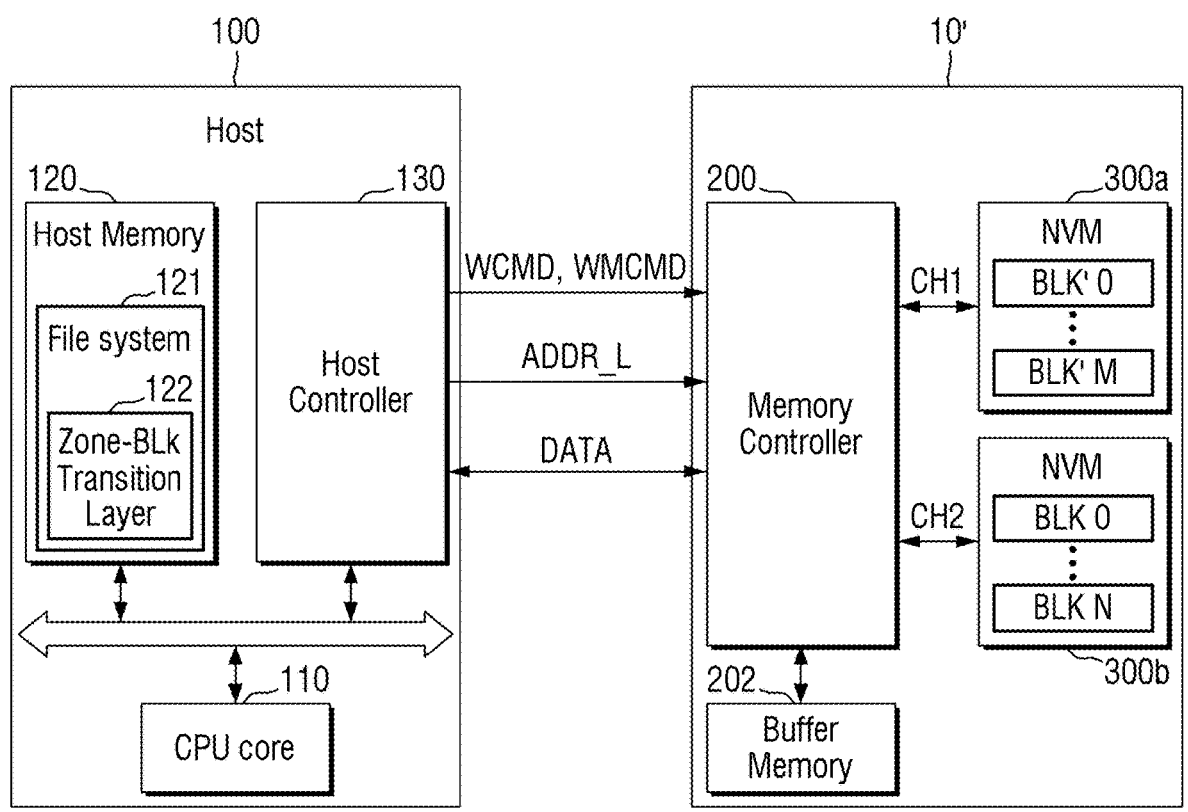
FIG. 22 is a block diagram for describing an electronic system including a storage device according to some example embodiments of the present disclosure.
Figure 23:
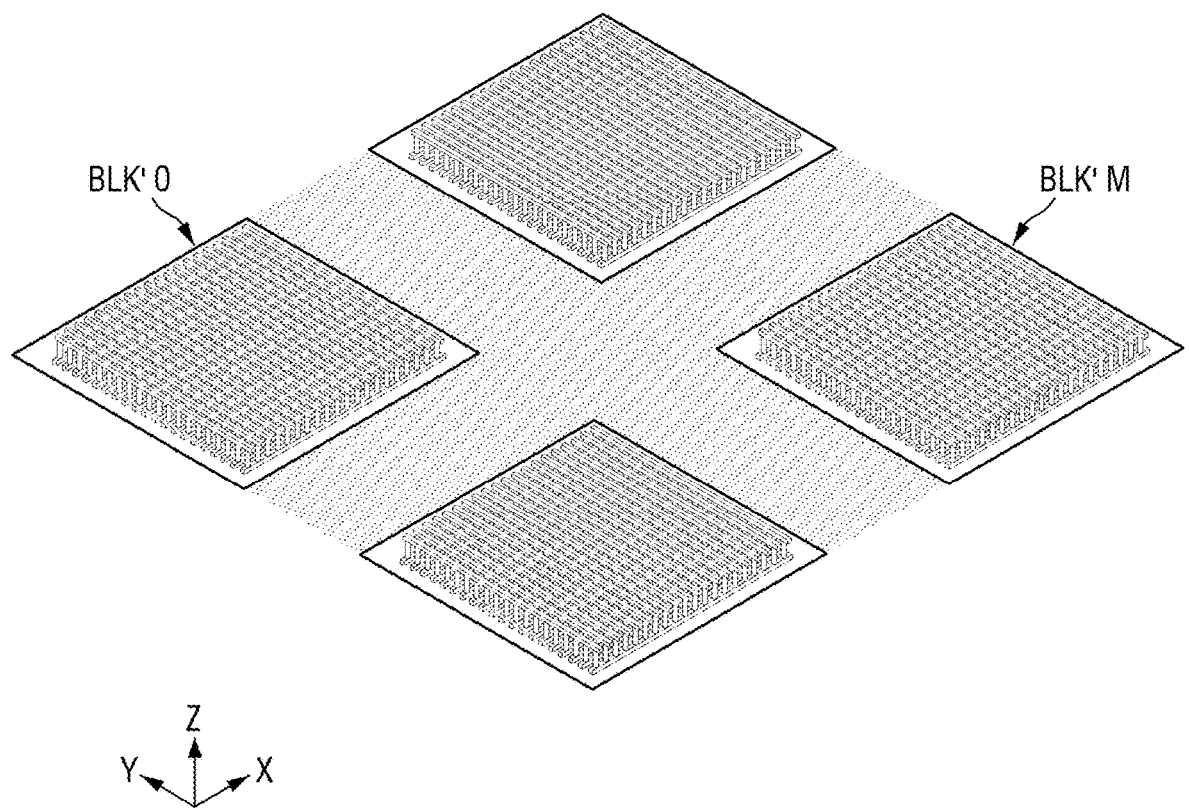
FIG. 23 is a diagram schematically illustrating the inside of a non-volatile memory according to some example embodiments of the present disclosure.
Figure 24:
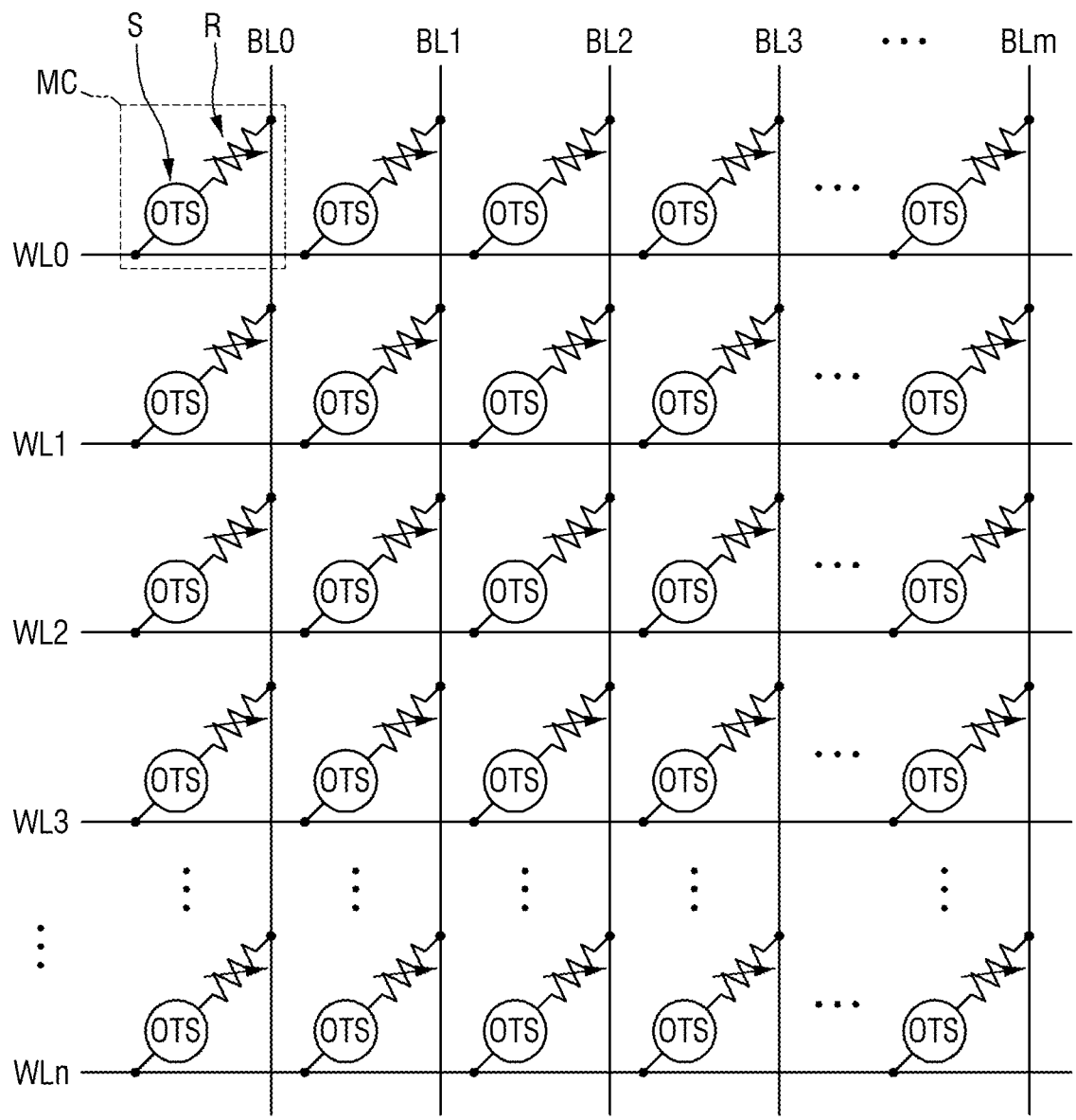
FIG. 24 is a circuit diagram illustrating a portion of a memory cell array according to some example embodiments of the present disclosure.

FIG. 22 is a block diagram for describing an electronic system 1c including a storage device 10' according to some example embodiments of the present disclosure. FIG. 23 is a diagram schematically illustrating the inside of an NVM according to some example embodiments. FIG. 24 is a circuit diagram illustrating a portion of a memory cell array according to some example embodiments of the present disclosure.

Referring to FIG. 22, a storage device 10' may include a first NVM 300a and a second NVM 300b. According to some example embodiments, the first NVM 300a and the second NVM 300b may be heterogeneous memories that are different from each other. For example, the first NVM 300a may be a PRAM or an MRAM, and the second NVM 300b may be a flash memory.

An operation of the first NVM 300a may be controlled through a first channel CH1 and an operation of the second NVM 300b may be controlled through a second channel CH2. A memory controller 200 may receive a write command WCMD and a logical address ADDR_L from the host device 100, and write the data DATA to the first and second NVMs 300a and 300b.

Non-volatile memory blocks BLK' 0 to BLK' M in the first NVM 300a, and memory blocks BLK 0 to BLK N in the second NVM 300b, may correspond to the 0th to 15th zones Z0 to Z15 of FIG. 10, respectively, and thus may each have a write mode set by a file system 121 of a host device 100.

A structure of the second NVM 300b of the storage device 10' may correspond to the structure of the NVM 300 of FIG. 2.

A structure of the first NVM 300a will be described with reference to FIGS. 23 and 24. The first NVM 300a may include a plurality of 0th to Mth non-volatile memory blocks BLK' 0 to BLK' M. The plurality of non-volatile memory blocks BLK' 0 to BLK' M may be disposed to be spaced apart from each other in a first direction X and/or a second direction Y. Each of the plurality of non-volatile memory blocks BLK' 0 to BLK' M includes a plurality of memory cells.

A description of a structure of the 0th non-volatile memory block BLK' 0 may correspond to descriptions of a structure of each of the remaining non-volatile memory blocks. The 0th non-volatile memory block BLK' 0 may include, for example, PRAM cells.

The 0th non-volatile memory block BLK' 0 may be a two-dimensional memory. When the 0th non-volatile memory block BLK' 0 is formed of multiple layers, the 0th non-volatile memory block BLK' 0 may be a three-dimensional memory.

The 0th non-volatile memory block BLK' 0 may include a plurality of word lines WL0 to WLn, a plurality of bit lines BL0 to BLm, and a plurality of memory cells MC. The number of word lines WL, the number of bit lines BL, and the number of memory cells MC may be variously modified according to some example embodiments. In addition, a set of memory cells that may be simultaneously or contemporaneously accessed by the same word line, or similar word lines, may be defined as a page.

In the 0th non-volatile memory block BLK' 0 according to some example embodiments of the present disclosure, each of the plurality of memory cells MC may include a variable resistance element R and a selection element S. Here, the variable resistance element R may be referred to as a variable resistor (alternatively, a variable resistance material), and the selection element S may be referred to as a switching element.

In the 0th non-volatile memory block BLK' 0 according to some example embodiments of the present disclosure, the selection element S may be an ovonic threshold switch (OTS) selector including a compound such as GeSe, GeS, AsSe, AsTe, AsS SiTe, SiSe, SiS, GeAs, SiAs, SnSe, SnTe, GeAsTe, GeAsSe, AlAsTe, AlAsSe, SiAsSe, SiAsTe, GeSeTe, GeSeSb, GaAsSe, GaAsTe, InAsSe, InAsTe, SnAsSe, SnAsTe, GeSiAsTe, GeSiAsSe, GeSiSeTe, GeSeTeSb, GeSiSeSb, GeSiTeSb, GeSeTeBi, GeSiSeBi, GeSiTeBi, GeAsSeSb, GeAsTeSb, GeAsTeBi, GeAsSeBi, GeAsSeIn, GeAsSeGa, GeAsSeAl, GeAsSeTl, GeAsSeSn, GeAsSeZn, GeAsTeIn, GeAsTeGa, GeAsTeAl, GeAsTeTl, GeAsTeSn, GeAsTeZn, GeSiAsSeTe, GeAsSeTeS, GeSiAsSeS, GeSiAsTeS, GeSiSeTeS, GeSiAsSeP, GeSiAsTeP, GeAsSeTeP, GeSiAsSeIn, GeSiAsSeGa, GeSiAsSeAl, GeSiAsSeTl, GeSiAsSeZn, GeSiAsSeSn, GeSiAsTeIn, GeSiAsTeGa, GeSiAsTeAl, GeSiAsTeTl, GeSiAsTeZn, GeSiAsTeSn, GeAsSeTeIn, GeAsSeTeGa, GeAsSeTeAl, GeAsSeTeTl, GeAsSeTeZn, GeAsSeTeSn, GeAsSeSIn, GeAsSeSGa, GeAsSeSAl, GeAsSeSTl, GeAsSeSZn, GeAsSeSSn, GeAsTeSIn, GeAsTeSGa, GeAsTeSAl, GeAsTeSTl, GeAsTeSZn, GeAsTeSSn, GeAsSeInGa, GeAsSeInAl, GeAsSeInTl, GeAsSeInZn, GeAsSeInSn, GeAsSeGaAl, GeAsSeGaTl, GeAsSeGaZn, GeAsSeGaSn, GeAsSeAlTl, GeAsSeAlZn, GeAsSEAlSn, GeAsSeTlZn, GeAsSeTlSn, GeAsSeZnSn, GeSiAsSeTeS, GeSiAsSeTeIn, GeSiAsSeTeGa, GeSiAsSeTeAl, GeSiAsSeTeTl, GeSiAsSeTeZn, GeSiAsSeTeSn, GeSiAsSeTeP, GeSiAsSeSIn, GeSiAsSeSGa, GeSiAsSeSAl, GeSiAsSeSTl, GeSiAsSeSZn, GeSiAsSeSSn, GeAsSeTeSIn, GeAsSeTeSGa, GeAsSeTeSAl, GeAsSeTeSTl, GeAsSeTeSZn, GeAsSeTeSSn, GeAsSeTePIn, GeAsSeTePGa, GeAsSeTePAl, GeAsSeTePTl, GeAsSeTePZn, GeAsSeTePSn, GeSiAsSeInGa, GeSiAsSeInAl, GeSiAsSeInTl, GeSiAsSeInZn, GeSiAsSeInSn, GeSiAsSeGaAl, GeSiAsSeGaTl, GeSiAsSeGaZn, GeSiAsSeGaSn, GeSiAsSeAlSn, GeAsSeTeInGa, GeAsSeTeInAl, GeAsSeTeInTl, GeAsSeTeInZn, GeAsSeTeInSn, GeAsSeTeGaAl, GeAsSeTeGaTl, GeAsSeTeGaZn, GeAsSeTeGaSn, GeAsSeTeAlSn, GeAsSeSInGa, GeAsSeSInAl, GeAsSeSInTl, GeAsSeSInZn, GeAsSeSInSn, GeAsSeSGaAl, GeAsSeSGaTl, GeAsSeSGaZn, GeAsSeSGaSn, and/or GeAsSeSAlSn.

For example, the variable resistance element R may be connected between one of the plurality of bit lines BL0 to BLm and the selection element S, and the selection element S may be connected between the variable resistance element R and one of the plurality of word lines WL0 to WLn.

However, the present disclosure is not limited thereto, and the selection element S may be connected between one of the plurality of bit lines BL0 to BLm and the variable resistance element R, and the variable resistance element R may be connected between the selection element S and one of the plurality of word lines WL0 to WLn.

The selection element S may be connected between any one of the plurality of word lines WL0 to WLn and the variable resistance element R, and may control a current supply to the variable resistance element R according to a voltage applied to the connected word line and bit line.

Conventional devices and methods for controlling memory devices use a memory controller of a respective memory device to perform memory management operations, such as garbage collection, therein. The memory controller performs program operations in units of pages and erase operations in units of blocks. However, the conventional devices and methods are unable to perform the memory management operations under the control of an external device (e.g., a host device). Accordingly, the conventional devices and methods for controlling memory devices are inefficient and are unable to implement different operating systems executed on the external device.

However, according to some example embodiments, improved devices and methods are provided for controlling memory devices. In particular, some example embodiments provide an external device (e.g., a host) with control over individual blocks of a memory device through the use of zones corresponding to the blocks. Accordingly, the improved devices and methods enable the external device to perform memory management operations (e.g., garbage collection) on the memory device. Thus, the improved devices and methods overcome the deficiencies of the conventional devices and methods to improve efficiency of the memory device and enable the implementation of different operating systems executed on the external device.

According to some example embodiments, operations described herein as being performed by the system 1000, the main processor 1100, the controller 1120, the accelerator block 1130, the storage controllers 1200a and 1200b, the storage devices 1010a and 1010b, the electronic system 1a, the storage device 10, the host device 100, the processor 110, the host controller 130, the memory controller 200, the processor 210, the working memory 220, the wear-leveling manager module 221, the mapping table manager module 222, the namespace manager module, the address decoder 320, the voltage generator 330, the read/write circuit 340, the control logic 350, the electronic system 1b, the electronic system 1c and/or the storage device 10' may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

It will be understood that when an element is referred to as being "connected" or "coupled" to another element, it may be directly connected or coupled to the other element or intervening elements may be present. As used herein the term "and/or" includes any and all combinations of one or more of the associated listed items.

Some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

However, the effects of some example embodiments are not restricted to the examples set forth herein. The above and other effects of some example embodiments will become more apparent to one of daily skill in the art to which the present disclosure pertains by referencing the claims.

What is claimed is:

1. A storage device comprising:
a non-volatile memory including a first memory block and a second memory block different from the first memory block; and
a memory controller configured to,
receive, from a host, a first write mode command corresponding to the first memory block and a second write mode command corresponding to the second memory block,
control the first memory block to perform a first write operation according to the first write mode command, the first write operation including sequentially writing first data to the first memory block, and
control the second memory block to perform a second write operation according to the second write mode command, the second write operation including sequentially writing second data to the second memory block, wherein
the first memory block stores first write mode data based on the first write mode command, the first write mode data indicating a first write mode among a plurality of write modes, and
the second memory block stores second write mode data based on the second write mode command, the second write mode data indicating a second write mode among the plurality of write modes.

2. The storage device of claim 1, wherein the memory controller is not configured to perform garbage collection.

3. The storage device of claim 2, wherein the memory controller is configured to:
receive a first write command after receiving the first write mode command, the first write command including temporary write mode data corresponding to the first memory block, and the temporary write mode data indicating one among the plurality of write modes; and
control the first memory block to store the first write mode data and the temporary write mode data in response to receiving the first write command.

4. The storage device of claim 1, wherein the memory controller is configured to:
control the first memory block to perform the first write operation according to a single-level cell write mode; and
control the second memory block to perform the second write operation according to a multiple level cell write mode.

5. The storage device of claim 4, wherein the multiple level cell write mode includes a multi-level cell write mode, a triple-level cell write mode, or a quadruple-level cell write mode.

6. The storage device of claim 1, wherein the memory controller is configured to:
receive a first write command after receiving the first write mode command, the first write command including temporary write mode data corresponding to the first memory block, and the temporary write mode data indicating one among the plurality of write modes; and
control the first memory block to perform a third write operation according to the first write command and the temporary write mode data.

7. The storage device of claim 6, wherein the memory controller is configured to:
receive a write mode reset command corresponding to the first memory block after receiving the first write command; and
control the first memory block to perform another write operation according to the first write mode command after receiving the write mode reset command.

8. The storage device of claim 1, wherein the memory controller is configured to perform a wear leveling operation in the same memory block unit as the first memory block and the second memory block.

9. The storage device of claim 1, wherein the memory controller is configured to:
receive a report command from the host; and
control the non-volatile memory to read the first write mode data and the second write mode data in response to receiving the report command.

10. An electronic system comprising:
a non-volatile memory including a first memory block and a second memory block;
a host including a file system having a first zone and a second zone, the first zone corresponding to the first memory block, and the second zone corresponding to the second memory block, the host configured to,
provide a first write mode command corresponding to the first memory block to a memory controller,
provide a second write mode command corresponding to the second memory block to the memory controller,
provide a first write command corresponding to the first zone to the memory controller, and
provide a second write command corresponding to the second zone to the memory controller; and
the memory controller configured to,
control the first memory block to perform a first write operation according to the first write command and the first write mode command, the first write operation including sequentially writing first data to the first memory block,
control the second memory block to perform a second write operation according to the second write command and the second write mode command, the second write operation including sequentially writing second data to the second memory block,
receive a third write command after receiving the first write mode command, the third write command including temporary write mode data corresponding to the first memory block, and the temporary write mode data indicating one among a plurality of write modes; and
control the first memory block to perform a third write operation according to the third write command and the temporary write mode data in response to receiving the third write command.

11. The electronic system of claim 10, wherein the memory controller is not configured to perform garbage collection.

12. The electronic system of claim 11, wherein the host is configured to perform the garbage collection from the first zone to the second zone.

13. The electronic system of claim 12, wherein the memory controller is configured to:
control the first memory block to perform the first write operation according to a single-level cell write mode; and
control the second memory block to perform the second write operation according to a multiple level cell write mode.

14. The electronic system of claim 10, wherein the memory controller is configured to perform a wear leveling operation in the same memory block unit as the first memory block and the second memory block.

15. A method of operating a storage device, the method comprising:
   receiving a first write mode command corresponding to a first memory block, the first memory block corresponding to a first zone in a file system;
   receiving a second write mode command corresponding to a second memory block, the second memory block corresponding to a second zone in the file system, and the second zone being different from the first zone;
   receiving a first write command corresponding to the first zone;
   performing a first write operation on the first memory block according to the first write command and the first write mode command, the first write operation including sequentially writing first data to the first memory block;
   receiving a second write command corresponding to the second zone;
   performing a second write operation on the second memory block according to the second write command and the second write mode command, the second write operation including sequentially writing second data to the second memory block;
   receiving a third write command after the receiving the first write mode command, the third write command including temporary write mode data corresponding to the first memory block, and the temporary write mode data indicating one among a plurality of write modes; and
   performing a third write operation according to the third write command and the temporary write mode data.

16. The method of claim 15, further comprising:
   receiving a write mode reset command corresponding to the first memory block after the receiving the third write command; and
   performing another a write operation on the first memory block according to the first write mode command in response to the receiving the write mode reset command.

17. The method of claim 15, further comprising:
   storing first write mode data in the first memory block based on the first write mode command, the first write mode data indicating a first write mode among a plurality of write modes; and
   storing second write mode data in the second memory block based on the second write mode command, the second write mode data indicating a second write mode among the plurality of write modes.

* * * * *